United States Patent
Tsuda et al.

(10) Patent No.: US 11,807,104 B2
(45) Date of Patent: Nov. 7, 2023

(54) VEHICLE DRIVE DEVICE

(71) Applicant: AISIN CORPORATION, Aichi (JP)

(72) Inventors: Kohei Tsuda, Kariya (JP); Keiichirou Kusabe, Kariya (JP); Bumpei Nakaya, Kariya (JP); Yasuhiro Matsumura, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/798,327

(22) PCT Filed: May 28, 2021

(86) PCT No.: PCT/JP2021/020376
§ 371 (c)(1),
(2) Date: Aug. 9, 2022

(87) PCT Pub. No.: WO2021/241726
PCT Pub. Date: Dec. 2, 2021

(65) Prior Publication Data
US 2023/0112389 A1    Apr. 13, 2023

(30) Foreign Application Priority Data

May 29, 2020 (JP) .................................. 2020-094621

(51) Int. Cl.
*B60W 20/20* (2016.01)
*B60W 20/40* (2016.01)
(Continued)

(52) U.S. Cl.
CPC ................ *B60K 6/52* (2013.01); *B60K 6/445* (2013.01)

(58) Field of Classification Search
CPC ...... B60W 10/02; B60W 10/06; B60W 10/08; B60W 20/10; B60W 20/40;
(Continued)

(56) References Cited

U.S. PATENT DOCUMENTS

| 5,713,814 A | 2/1998 | Hara et al. | |
| 2012/0232735 A1* | 9/2012 | Hashizaka | ............. B60L 50/51 |
| | | | 701/22 |

FOREIGN PATENT DOCUMENTS

| JP | 09-46820 A | 2/1997 | |
| JP | 2001204105 A * | 7/2001 | ............. B60K 6/543 |

(Continued)

OTHER PUBLICATIONS

International Search Report of PCT/JP2021/020376 dated Aug. 24, 2021 [PCT/ISA/210].

*Primary Examiner* — Tisha D Lewis
(74) *Attorney, Agent, or Firm* — Sughrue Mion, PLLC

(57) ABSTRACT

A vehicle drive device includes a first drive unit that drives first wheels; a second drive unit that drives second wheels; and a control device. When the state of charge of an electrical storage device is less than a first threshold value and a vehicle speed is less than a second threshold value, the control device performs control such that when the vehicle speed is greater than or equal to zero and required drive power is greater than or equal to zero, the operating mode of the first drive unit is set to a second mode to output the required drive power from the second drive unit, and when the vehicle speed is greater than zero and the required drive power is less than zero, the operating mode of the first drive unit is set to a first mode so the first drive power source can generate electric power.

5 Claims, 10 Drawing Sheets

(51) Int. Cl.
*B60K 6/52* (2007.10)
*B60K 6/445* (2007.10)

(58) Field of Classification Search
CPC ....... B60W 2510/244; B60W 2520/10; B60W 10/023; B60W 2510/0208; B60W 2510/0638; B60W 2510/0657; B60W 2510/081; B60W 2510/083; B60W 2510/1005; B60W 2540/10; B60W 2540/12; B60W 2710/021; B60W 2710/0644; B60W 2710/0666; B60W 2710/081; B60W 2710/083; B60W 2710/1005; B60W 2710/1077; B60W 10/115; B60W 20/20; B60W 10/26; B60W 20/13; B60K 6/365; B60K 6/52; B60K 6/445; B60K 17/354; B60K 17/356; B60K 23/0808; B60K 6/40; B60K 6/387; B60K 6/448; B60K 6/547; B60L 15/20; B60L 50/16; B60L 50/60; B60L 58/12; B60Y 2200/92
See application file for complete search history.

(56) References Cited

FOREIGN PATENT DOCUMENTS

| | | | | | |
|---|---|---|---|---|---|
| JP | 2008221934 | A | * | 9/2008 | ............ B60W 10/06 |
| JP | 2011068211 | A | * | 4/2011 | ............ B60W 10/06 |

* cited by examiner

|              | CL1 | CL2 | CL3 |
|--------------|-----|-----|-----|
| eTC mode     | ○   | ×   | Lo  |
| First EV mode| ×   | ○   | Lo  |
| Second EV mode| ×  | ○   | Hi  |
| First HV mode| ○   | ○   | Lo  |
| Second HV mode| ○  | ○   | Hi  |
| Charge mode  | ○   | ○   | N   |

VEHICLE DRIVE DEVICE

CROSS REFERENCE TO RELATED APPLICATIONS

This application is a National Stage of International Application No. PCT/JP2021/020376, filed May 28, 2021, claiming priority to Japanese Patent Application No. 2020-094621, filed May 29, 2020, the entire contents of which are incorporated herein by reference.

TECHNICAL FIELD

The present disclosure relates to a vehicle drive device for driving wheels.

BACKGROUND ART

An example of such a vehicle drive device is disclosed in the following Patent Literature 1. In the following description of the Background Art section (description of the "Background Art" section and the "Technical Problems" section), reference signs in Patent Literature 1 are quoted in parentheses.

A vehicle drive device of Patent Literature 1 is configured to be able to switch the operating mode according to the state of a vehicle. Specifically, in the vehicle drive device of Patent Literature 1, when the state of charge of an electrical storage device (7) is relatively low, switching to a power-split mode is performed in which a rotating electrical machine (5) outputs reaction torque of output torque of an internal combustion engine (1), and the vehicle moves forward by combined torque of the internal combustion engine (1) and the rotating electrical machine (5). On the other hand, when the electrical storage device (7) is in a fully charged state, switching to a parallel hybrid mode is performed in which the rotating electrical machine (5) adds torque to output torque of the internal combustion engine (1), and the vehicle moves forward by output torque of both of the internal combustion engine (1) and the rotating electrical machine (5).

CITATIONS LIST

Patent Literature

Patent Literature 1: JP 9-46820 A

SUMMARY OF THE DISCLOSURE

Technical Problems

As described above, in the vehicle drive device of Patent Literature 1, when the state of charge of the electrical storage device (7) is relatively low, switching to the power-split mode is performed. In the power-split mode, the rotating electrical machine (5) generates electric power, by which the electrical storage device (7) can be charged. However, for example, when vehicle speed is high, the rotating electrical machine (5) may not be able to generate electric power in the power-split mode, depending on the state of the vehicle. As such, in the vehicle drive device of Patent Literature 1, there has been a possibility of not being able to sufficiently secure the state of charge of the electrical storage device (7).

Hence, it is desired to implement a vehicle drive device that can sufficiently secure the state of charge of the electrical storage device.

Solutions to Problems

A configuration of a vehicle drive device in view of the above description is such that a vehicle drive device for driving front wheels and rear wheels of a vehicle includes:
with either one of the front wheels and the rear wheels being first wheels and an other one being second wheels,
a first drive unit that includes an input member and a first drive power source and drives the first wheels, the input member being drive-coupled to an internal combustion engine included in the vehicle;
a second drive unit that includes a second drive power source and drives the second wheels; and
a control device that controls the first drive unit, the second drive unit, and the internal combustion engine,
the first drive power source is a rotating electrical machine that gives and receives electric power to/from an electrical storage device,
the first drive unit has a first mode and a second mode as operating modes,
the first mode provides a state in which power transmission between the internal combustion engine and the first wheels is cut off, and a state in which power transmission between the first drive power source and the first wheels is performed,
the second mode provides a state in which power transmission between the internal combustion engine and the first drive power source is performed, and a state in which power transmission between both of the internal combustion engine and the first drive power source and the first wheels is cut off and the first drive power source generates electric power by drive power transmitted from the internal combustion engine, and
when a state of charge of the electrical storage device is less than a defined first threshold value and a speed of the vehicle is less than a defined second threshold value,
the control device performs control such that
when the speed of the vehicle is greater than or equal to zero and required drive power is greater than or equal to zero, the operating mode of the first drive unit is set to the second mode to output the required drive power from the second drive unit, the required drive power being drive power required for the vehicle, and
when the speed of the vehicle is greater than zero and the required drive power is less than zero, the operating mode of the first drive unit is set to the first mode to allow the first drive power source to generate electric power by regeneration, and to bring the internal combustion engine into an operating state to output the required drive power from both of the first drive unit and the second drive unit.

According to the configuration, when the state of charge of the electrical storage device is less than the first threshold value and the speed of the vehicle is less than the second threshold value, the control device performs control such that when the vehicle attempts to continue to stop, or when the vehicle attempts to accelerate, or when the vehicle attempts to travel at constant speed, the operating mode of the first drive unit is set to the second mode to output required drive power from the second drive unit. The second mode provides a state in which the first drive power source generates electric power by drive power transmitted from the internal combustion engine. Hence, while drive power required is secured by the second drive unit, the first drive power source can generate electric power using drive power of the internal combustion engine. Thus, during the stop, acceleration, and traveling at constant speed of the vehicle, the electrical storage device can be appropriately charged.

In addition, when the state of charge of the electrical storage device is less than the first threshold value and the speed of the vehicle is less than the second threshold value, the control device performs control such that when the vehicle attempts to decelerate, the operating mode of the first drive unit is set to the first mode to allow the first drive power source to generate electric power by regeneration, and to bring the internal combustion engine into an operating state to output required drive power from both of the first drive unit and the second drive unit. Hence, using an inertial force of the vehicle, the first drive power source can generate electric power. In addition, at this time, since the internal combustion engine is in an operating state without being stopped, after completion of the deceleration of the vehicle, the operating mode of the first drive unit transitions to the second mode at an early stage, by which charging of the electrical storage device can continue. Thus, during deceleration of the vehicle, in a state in which a mode transition after completion of the deceleration can be promptly performed, the electrical storage device can be appropriately charged.

As described above, according to this configuration, during a stop of the vehicle, and during traveling at constant speed, acceleration, and deceleration of the vehicle traveling at a relatively low speed, the electrical storage device can be appropriately charged. Thus, the state of charge of the electrical storage device can be sufficiently secured.

DESCRIPTION OF EMBODIMENTS

Figure 1:
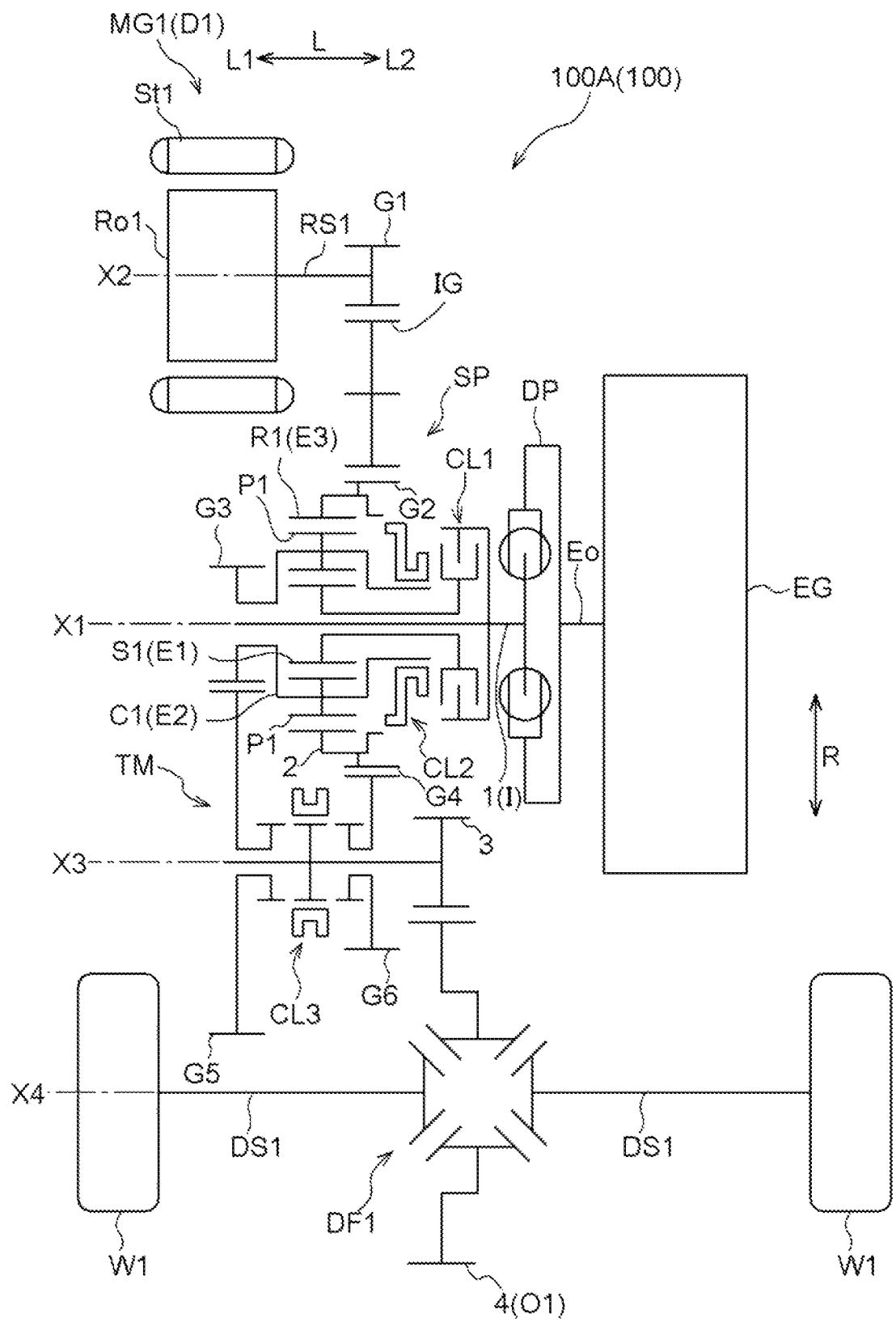
FIG. 1 is a skeleton diagram of a first drive unit of a vehicle drive device according to an embodiment.
Figure 2:
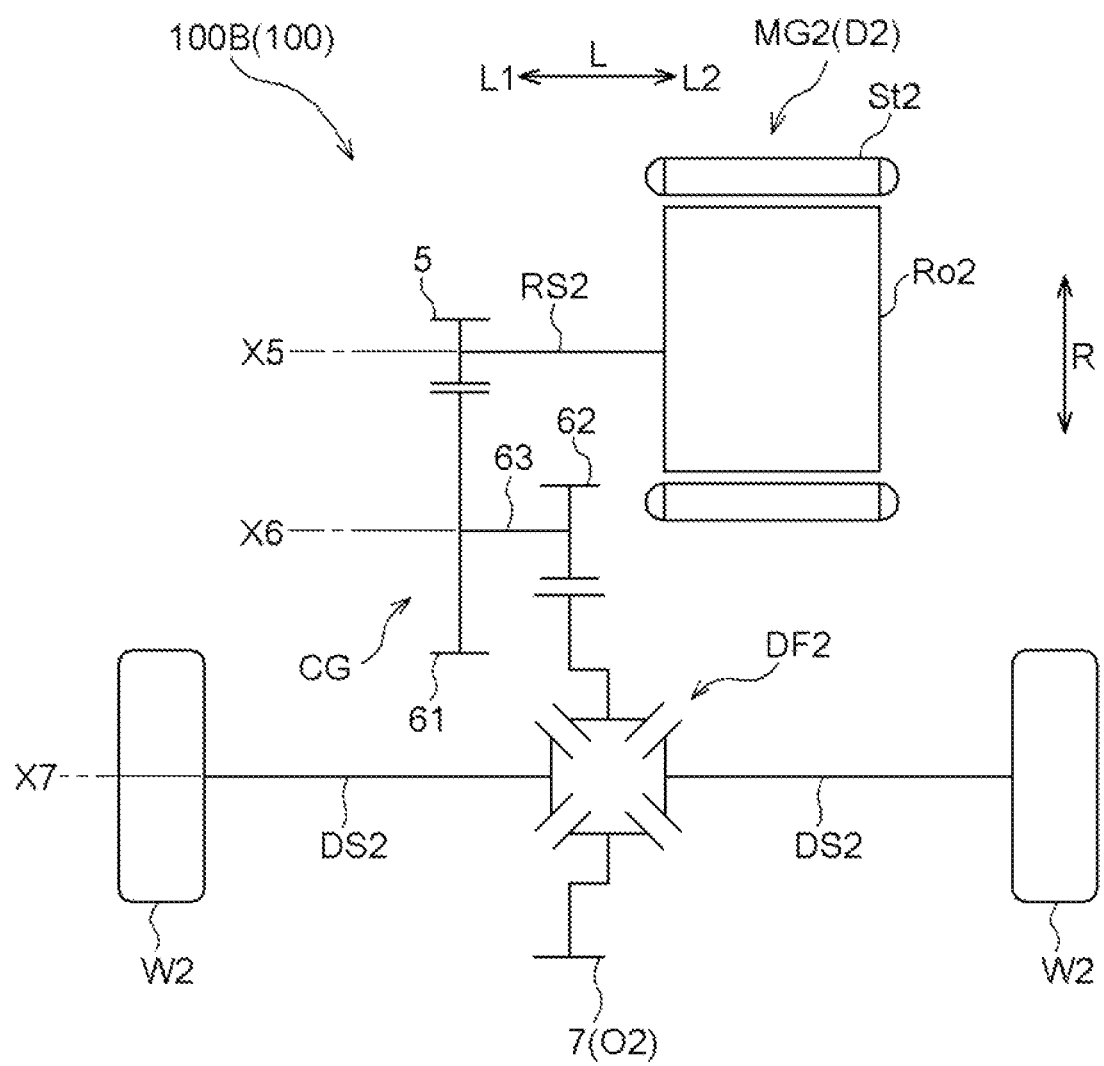
FIG. 2 is a skeleton diagram of a second drive unit of the vehicle drive device according to the embodiment.

A vehicle drive device 100 according to an embodiment will be described below with reference to the drawings. As shown in FIGS. 1 and 2, the vehicle drive device 100 includes a first drive unit 100A that drives a pair of first wheels W1; and a second drive unit 100B that drives a pair of second wheels W2. In the present embodiment, the first wheels W1 are front wheels of a vehicle and the second wheels W2 are rear wheels of the vehicle.

As shown in FIG. 1, the first drive unit 100A includes an input member I that is drive-coupled to an internal combustion engine EG included in the vehicle; and a first drive power source D1 that functions as a drive power source of the first wheels W1. In the present embodiment, the first drive unit 100A further includes a first output member O1 that is drive-coupled to the first wheels W1; a distribution differential gear mechanism SP; a transmission TM; a first output differential gear mechanism DF1; a first engagement device CL1; and a second engagement device CL2.

Here, the term "drive-coupled" as used in this application indicates a state in which two rotating elements are coupled together such that they can transmit drive power, and includes a state in which the two rotating elements are coupled together such that they rotate together or a state in which the two rotating elements are coupled together through one or two or more power transmission members such that they can transmit drive power. Such power transmission members include various types of members that transmit rotation at the same speed or at a changed speed, e.g., shafts, gear mechanisms, belts, and chains. Note that the power transmission members may include engagement devices that selectively transmit rotation and drive power, e.g., friction engagement devices and mesh engagement devices. Note, however, that when the term "drive-coupled" is used for each rotating element of a planetary gear mechanism, it indicates a state in which a plurality of rotating elements of the planetary gear mechanism are coupled together without any other rotating element therebetween.

In the present embodiment, the input member I, the distribution differential gear mechanism SP, the first engagement device CL1, and the second engagement device CL2 are disposed on a first axis X1 serving as the center of axis of rotation thereof. The first drive power source D1 is disposed on a second axis X2 serving as the center of axis of rotation thereof. Furthermore, the transmission TM is disposed on a third axis X3 serving as the center of axis of rotation thereof. In addition, the first output member O1 and the first output differential gear mechanism DF1 are disposed on a fourth axis X4 serving as the center of axis of rotation thereof.

As shown in FIG. 2, the second drive unit 100B includes a second drive power source D2 that functions as a drive power source of the second wheels W2. In the present embodiment, the second drive unit 100B further includes a second output member O2 that is drive-coupled to the second wheels W2; a counter gear mechanism CG; and a second output differential gear mechanism DF2.

In the present embodiment, the second drive power source D2 is disposed on a fifth axis X5 serving as the center of axis of rotation thereof. The counter gear mechanism CG is disposed on a sixth axis X6 serving as the center of axis of rotation thereof. In addition, the second output member O2 and the second output differential gear mechanism DF2 are disposed on a seventh axis X7 serving as the center of axis of rotation thereof.

In this example, the above-described axes X1 to X7 are disposed parallel to each other. In the following description, a direction parallel to the axes X1 to X7 is referred to as the "axial direction L" of the vehicle drive device 100. As shown in FIG. 1, a side in the axial direction L of the internal combustion engine EG on which the input member I is disposed is referred to as "axial first side L1" and the opposite side thereto is referred to as "axial second side L2". In addition, a direction orthogonal to each of the axes X1 to X7 is referred to as "radial direction R" with reference to each axis. Note that when there is no need to distinguish which axis is used as a reference axis or when it is obvious which axis is used as a reference axis, it may be simply referred to as "radial direction R".

In the present embodiment, the input member I is an input shaft 1 extending in the axial direction L. The input shaft 1 is drive-coupled to an output shaft Eo of the internal combustion engine EG through a damper device DP that attenuates fluctuations in torque to be transmitted. The internal combustion engine EG is a prime mover (a gasoline engine, a diesel engine, etc.) that is driven by fuel combustion to take out power. In the present embodiment, the internal combustion engine EG functions as a drive power source of the first wheels W1.

Figure 3:
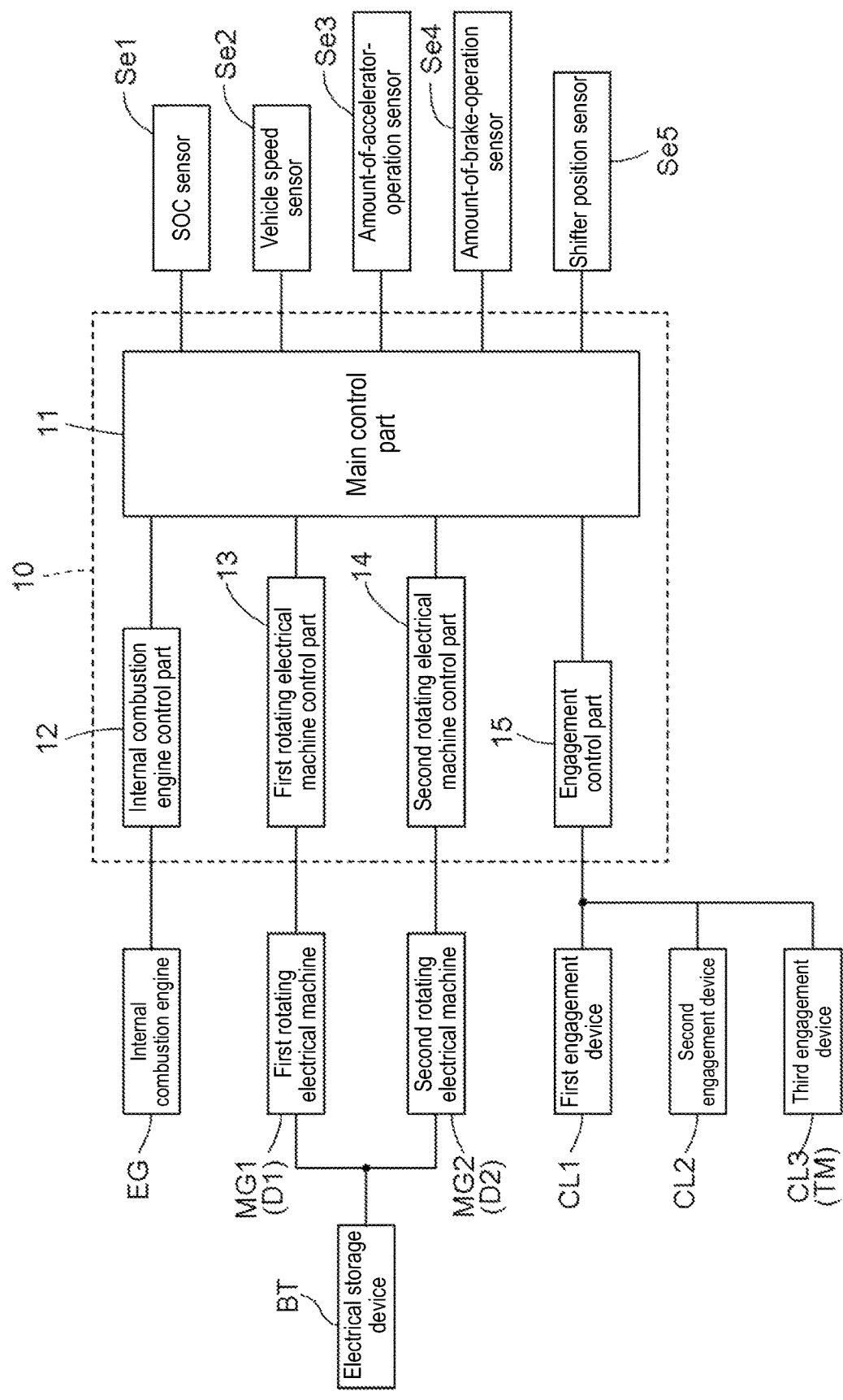
FIG. 3 is a control block diagram of the vehicle drive device according to the embodiment.

In the present embodiment, the first drive power source D1 is a first rotating electrical machine MG1 that gives and receives electric power to/from an electrical storage device BT (see FIG. 3). The first rotating electrical machine MG1 has a function of a motor that generates power by receiving supply of electric power, and a function of a generator that generates electric power by receiving supply of power. Specifically, the first rotating electrical machine MG1 is electrically connected to the electrical storage device BT such as a battery or a capacitor. The first rotating electrical machine MG1 generates drive power by performing motoring by electric power stored in the electrical storage device BT. In addition, the first rotating electrical machine MG1 generates electric power by drive power of the internal combustion engine EG or drive power transmitted from a first output member O1 side, to charge the electrical storage device BT.

The first rotating electrical machine MG1 includes a first stator St1 and a first rotor Ro1. The first stator St' is fixed to a non-rotating member (e.g., a case that accommodates the first rotating electrical machine MG1, etc.). The first rotor Ro1 is rotatably supported by the first stator St1. In the present embodiment, the first rotor Ro1 is disposed on an inner side in the radial direction R of the first stator St1.

The distribution differential gear mechanism SP includes a first rotating element E1, a second rotating element E2, and a third rotating element E3. The first rotating element E1 is drive-coupled to the input member I. The second rotating element E2 is drive-coupled to the first output member O1. The third rotating element E3 is drive-coupled to the first drive power source D1.

In the present embodiment, the distribution differential gear mechanism SP is a planetary gear mechanism including a first sun gear S1, a first carrier C1, and a first ring gear R1. In this example, the distribution differential gear mechanism SP is a single-pinion planetary gear mechanism including the first carrier C1 that supports a first pinion gear P1; the first sun gear S1 that meshes with the first pinion gear P1; and the first ring gear R1 that is disposed on outer side in the radial direction R of the first sun gear S1 and meshes with the first pinion gear P1.

The order of rotational speed of the rotating elements of the distribution differential gear mechanism SP is the first rotating element E1, the second rotating element E2, and the third rotating element E3. Thus, in the present embodiment, the first rotating element E1 is the first sun gear S1. The second rotating element E2 is the first carrier C1. The third rotating element E3 is the first ring gear R1.

Here, the term "order of rotational speed" refers to the order of rotational speed in a rotating state of each rotating element. The rotational speed of each rotating element changes depending on the rotating state of the planetary gear mechanism, but the increasing order of rotational speed of the rotating elements is fixed because the order is determined by the structure of the planetary gear mechanism. Note that the order of rotational speed of the rotating elements is equal to the order of disposition in speed diagrams of each rotating element (see FIGS. 5 and 6, etc.). Here, the term "order of disposition in speed diagrams of each rotating element" refers to the order in which axes corresponding to the respective rotating elements in the speed diagrams are disposed in a direction orthogonal to the axes. The direction in which axes corresponding to the respective rotating elements are disposed in a speed diagram varies depending on how the speed diagram is drawn, but the order of disposition of the rotating elements is fixed because the order of disposition of the rotating elements is determined by the structure of the planetary gear mechanism.

As shown in FIG. 1, in the present embodiment, the first drive unit 100A includes a first gear G1 that rotates together with the first rotor Ro1 of the first rotating electrical machine MG1; and a second gear G2 that is drive-coupled to the first gear G1. In an example shown, the first gear G1 is drive-coupled to the second gear G2 through an idler gear IG. The idler gear IG meshes with each of the first gear G1 and the second gear G2.

In the present embodiment, the first gear G1 is disposed on the second axis X2. The first gear G1 is coupled to the first rotor Ro1 through a first rotor shaft RS1 extending in the axial direction L, so as to rotate together with the first rotor Ro1.

In the present embodiment, the second gear G2 is disposed on the first axis X1. The second gear G2 is disposed at a location which is on an outer side in the radial direction R of the first ring gear R1 of the distribution differential gear mechanism SP, and at which the second gear G2 overlaps the distribution differential gear mechanism SP as viewed radially in the radial direction R. Here, for disposition of two elements, "to overlap as viewed in a specific direction" indicates that when a virtual straight line parallel to the line-of-sight direction is moved in each direction orthogonal to the virtual straight line, a region in which the virtual straight line intersects both of the two elements is present in at least a part of the two elements.

In addition, in the present embodiment, the second gear G2 is coupled to the first ring gear R1 so as to rotate together with the first ring gear R1. In this example, a cylindrical gear forming member 2 whose center of axis is the first axis X1 is provided. The second gear G2 is formed on an outer circumferential surface of the gear forming member 2, and the first ring gear R1 is formed on an inner circumferential surface of the gear forming member 2.

The transmission TM includes a third engagement device CL3. The transmission TM changes the speed of rotation transmitted from the distribution differential gear mechanism SP at a transmission gear ratio determined based on a shift speed formed by the third engagement device CL3, and transmits the rotation to the first output member O1. Note that when the transmission gear ratio determined based on a shift speed formed by the third engagement device CL3 is 1, the transmission TM transmits rotation transmitted from the distribution differential gear mechanism SP as it is to the first output member O1. In the present embodiment, the third engagement device CL3 forms either one of a first shift speed (low shift speed) ST1 with a relatively large transmission gear ratio and a second shift speed (high shift speed) ST2 with a smaller transmission gear ratio than the first shift speed ST1.

In the present embodiment, the transmission TM includes a third gear G3, a fourth gear G4, a fifth gear G5, a sixth gear G6, and a transmission output gear 3. In the present embodiment, the third gear G3 and the fourth gear G4 are disposed on the first axis X1. The fifth gear G5, the sixth gear G6, and the transmission output gear 3 are disposed on the third axis X3.

The third gear G3 is coupled to the first carrier C1 of the distribution differential gear mechanism SP so as to rotate together with the first carrier C1. In the present embodiment, the third gear G3 is disposed on an axial first side L1 of the distribution differential gear mechanism SP. In addition, in the present embodiment, the first rotating electrical machine MG1 is disposed at a location at which the first rotating electrical machine MG1 overlaps both of the third gear G3 and the distribution differential gear mechanism SP as viewed radially in the radial direction R.

The fourth gear G4 is coupled to the first ring gear R1 of the distribution differential gear mechanism SP so as to rotate together with the first ring gear R1. In the present embodiment, the fourth gear G4 is disposed at a location which is on the outer side in the radial direction R of the first ring gear R1 and at which the fourth gear G4 overlaps the distribution differential gear mechanism SP as viewed radially in the radial direction R. That is, in the present embodiment, the transmission TM and the distribution differential gear mechanism SP are disposed so as to overlap each other as viewed radially in the radial direction R. In the example shown, of the constituent members of the transmission TM, the fourth gear G4 and the sixth gear G6 overlap the distribution differential gear mechanism SP as viewed radially. In addition, the third engagement device CL3 also overlaps the distribution differential gear mechanism SP as viewed radially. In addition, in this example, the fourth gear G4 also functions as the second gear G2. In other words, the second gear G2 and the fourth gear G4 are formed as a single gear on the outer circumferential surface of the gear forming member 2. By this, compared with a configuration in which the second gear G2 and the fourth gear G4 are provided independently of each other, the manufacturing cost of the vehicle drive device 100 (first drive unit 100A) can be reduced.

The fifth gear G5 meshes with the third gear G3. The sixth gear G6 meshes with the fourth gear G4. In the present embodiment, the sixth gear G6 meshes with the fourth gear G4 at a location in a circumferential direction of the fourth gear G4 (second gear G2) that differs from the first gear G1. The transmission output gear 3 is formed so as to be rotatable relative to the fifth gear G5 and the sixth gear G6.

The number of teeth of the third gear G3 differs from the number of teeth of the fourth gear G4. That is, the outside diameter of the third gear G3 differs from the outside diameter of the fourth gear G4. As described above, the third gear G3 and the fourth gear G4 are disposed on the same axis, and the fifth gear G5 that meshes with the third gear G3 and the sixth gear G6 that meshes with the fourth gear G4 are disposed on the same axis. Hence, when the outside diameter of the third gear G3 is smaller than the outside diameter of the fourth gear G4, the outside diameter of the fifth gear G5 is larger than the outside diameter of the sixth gear G6. On the other hand, when the outside diameter of the third gear G3 is larger than the outside diameter of the fourth gear G4, the outside diameter of the fifth gear G5 is smaller than the outside diameter of the sixth gear G6. Thus, the gear ratio of the fifth gear G5 to the third gear G3 differs from the gear ratio of the sixth gear G6 to the fourth gear G4. In the present embodiment, the outside diameter of the third gear G3 is smaller than the outside diameter of the fourth gear G4, and the number of teeth of the third gear G3 is smaller than the number of teeth of the fourth gear G4. Hence, in the present embodiment, the outside diameter of the fifth gear G5 is larger than the outside diameter of the sixth gear G6, and the number of teeth of the fifth gear G5 is larger than the number of teeth of the sixth gear G6. Thus, the gear ratio of the fifth gear G5 to the third gear G3 is larger than the gear ratio of the sixth gear G6 to the fourth gear G4.

In the present embodiment, the third engagement device CL3 is configured to couple either one of the fifth gear G5 and the sixth gear G6 to the transmission output gear 3. As described above, in the present embodiment, the gear ratio of the fifth gear G5 to the third gear G3 is larger than the gear ratio of the sixth gear G6 to the fourth gear G4. Hence, when the third engagement device CL3 couples the fifth gear G5 to the transmission output gear 3, the first shift speed (low shift speed) ST1 with a larger transmission gear ratio than the second shift speed ST2 is formed. On the other hand, when the third engagement device CL3 couples the sixth gear G6 to the transmission output gear 3, the second shift speed (high shift speed) ST2 with a smaller transmission gear ratio than the first shift speed ST1 is formed.

Furthermore, in the present embodiment, the third engagement device CL3 is configured to be able to switch to a neutral state in which neither the first shift speed ST1 nor the second shift speed ST2 is formed. When the third engagement device CL3 is in a neutral state, the transmission TM goes into a state in which rotation transmitted from the distribution differential gear mechanism SP is not transmitted to the first output member O1, i.e., a state in which drive power of both of the internal combustion engine EG and the first rotating electrical machine MG1 is not transmitted to the first wheels W1.

A state in which the third engagement device CL3 forms either one of the first shift speed ST1 and the second shift speed ST2 corresponds to an engaged state of the third engagement device CL3. On the other hand, the neutral state of the third engagement device CL3 corresponds to a disengaged state of the third engagement device CL3. In this example, the third engagement device CL3 is a mesh engagement device (dog clutch) configured to be able to switch between an engaged state and a disengaged state by an actuator such as a solenoid, a motor, or a hydraulic cylinder.

The first output differential gear mechanism DF1 is configured to distribute rotation of the first output member O1 to the pair of first wheels W1. In the present embodiment, the first output member O1 is a first differential input gear 4 that meshes with the transmission output gear 3.

In the present embodiment, the first output differential gear mechanism DF1 is a bevel gear type differential gear mechanism. Specifically, the first output differential gear mechanism DF1 includes a first hollow differential case; a first pinion shaft supported so as to rotate together with the first differential case; a pair of first pinion gears rotatably supported on the first pinion shaft; and a pair of first side gears that mesh with the pair of first pinion gears to function as distribution output elements. The first differential case accommodates the first pinion shaft, the pair of first pinion gears, and the pair of first side gears. In the present embodiment, the first differential input gear 4 serving as the first output member O1 is coupled to the first differential case so as to protrude toward an outer side in the radial direction R of the first differential case. First driveshafts DS1 that are drive-coupled to the first wheels W1 are coupled to the pair of first side gears so that the first driveshafts DS1 and the pair of first side gears can rotate together. By this configuration, the first output differential gear mechanism DF1 distributes rotation of the first output member O1 (first differential input gear 4) to the pair of first wheels W1 through a pair of the first driveshafts DS1.

The first engagement device CL1 is an engagement device that disengages and engages power transmission between the input member I and the first rotating element E1 of the distribution differential gear mechanism SP. In the present embodiment, the first engagement device CL1 is configured to disengage and engage power transmission between the input member I and the first sun gear S1. In this example, the first engagement device CL1 is a friction engagement device including a pair of friction members, and the state of engagement between the pair of friction members is controlled by hydraulic pressure. By this, with the first engagement device CL1 being in a slip-engaged state, the transmission torque capacity of the first engagement device CL1 can be controlled. Thus, when the internal combustion engine EG is allowed to start using drive power of the first rotating electrical machine MG1, torque transmitted from the first rotating electrical machine MG1 to the internal combustion engine EG can be controlled, and thus, there is no need to temporarily stop the first rotating electrical machine MG1. Here, the term "slip-engaged state" is an engaged state in which there is a rotational speed difference (slippage) between the pair of friction members of the friction engagement device.

The second engagement device CL2 is an engagement device that disengages and engages power transmission between two rotating elements selected from among the three rotating elements, the first rotating element E1, the second rotating element E2, and the third rotating element E3, of the distribution differential gear mechanism SP. In the present embodiment, the second engagement device CL2 is configured to disengage and engage power transmission between the first carrier C1 serving as the second rotating element E2 and the first ring gear R1 serving as the third rotating element E3. The second engagement device CL2 is disposed between the first engagement device CL1 and the distribution differential gear mechanism SP in the axial direction L. In this example, the second engagement device CL2 is a mesh engagement device (dog clutch) configured to be able to switch between an engaged state and a disengaged state by an actuator such as a solenoid, a motor, or a hydraulic cylinder.

As shown in FIG. 2, in the present embodiment, the second drive power source D2 is a second rotating electrical machine MG2 that gives and receives electric power to/from the electrical storage device BT (see FIG. 3). The second rotating electrical machine MG2 has a function of a motor that generates power by receiving supply of electric power, and a function of a generator that generates electric power by receiving supply of power. Specifically, the second rotating electrical machine MG2 is electrically connected to the electrical storage device BT. The second rotating electrical machine MG2 generates drive power by performing motoring by electric power stored in the electrical storage device BT. In addition, during regeneration, the second rotating electrical machine MG2 generates electric power by drive power transmitted from a second output member O2 side, to charge the electrical storage device BT.

The second rotating electrical machine MG2 includes a second stator St2 and a second rotor Ro2. The second stator St2 is fixed to a non-rotating member (e.g., a case that accommodates the second rotating electrical machine MG2, etc.). The second rotor Ro2 is rotatably supported by the second stator St2. In the present embodiment, the second rotor Ro2 is disposed on an inner side in the radial direction R of the second stator St2.

In the present embodiment, the second drive unit 100B includes a rotor gear 5 that rotates together with the second rotor Ro2. The rotor gear 5 is disposed on the fifth axis X5. The rotor gear 5 is coupled to the second rotor Ro2 through a second rotor shaft RS2 extending in the axial direction L, so as to rotate together with the second rotor Ro2.

The counter gear mechanism CG includes a counter input gear 61, a counter output gear 62, and a countershaft 63 that couples the gears 61 and 62 together so that the gears 61 and 62 rotate together.

The counter input gear 61 is an input element of the counter gear mechanism CG. The counter input gear 61 meshes with the rotor gear 5.

The counter output gear 62 is an output element of the counter gear mechanism CG. In the present embodiment, the counter output gear 62 is disposed more to the axial second side L2 than the counter input gear 61. In addition, in the present embodiment, the counter output gear 62 is formed to be smaller in diameter than the counter input gear 61.

The second output differential gear mechanism DF2 is configured to distribute rotation of the second output member O2 to the pair of second wheels W2. In the present embodiment, the second output member O2 is a second differential input gear 7 that meshes with the counter output gear 62 of the counter gear mechanism CG.

In the present embodiment, the second output differential gear mechanism DF2 is a bevel gear type differential gear mechanism. Specifically, the second output differential gear mechanism DF2 includes a second hollow differential case; a second pinion shaft supported so as to rotate together with the second differential case; a pair of second pinion gears rotatably supported on the second pinion shaft; and a pair of second side gears that mesh with the pair of second pinion gears to function as distribution output elements. The second differential case accommodates the second pinion shaft, the pair of second pinion gears, and the pair of second side gears. In the present embodiment, the second differential input gear 7 serving as the second output member O2 is coupled to the second differential case so as to protrude toward an outer side in the radial direction R of the second differential case. Second driveshafts DS2 that are drive-coupled to the second wheels W2 are coupled to the pair of second side gears so that the second driveshafts DS2 and the pair of second side gears can rotate together. By this configuration, the second output differential gear mechanism DF2 distributes rotation of the second output member O2 (second differential input gear 7) to the pair of second wheels W2 through a pair of the second driveshafts DS2.

As shown in FIG. 3, the vehicle drive device 100 includes a control device 10 that controls the first drive unit 100A, the second drive unit 100B, and the internal combustion engine EG. In the present embodiment, the control device 10 includes a main control part 11; an internal combustion engine control part 12 that controls the internal combustion engine EG; a first rotating electrical machine control part 13 that controls the first rotating electrical machine MG1; a second rotating electrical machine control part 14 that controls the second rotating electrical machine MG2; and an engagement control part 15 that controls the states of engagement of the first engagement device CL1, the second engagement device CL2, and the third engagement device CL3.

The main control part 11 outputs to each of the internal combustion engine control part 12, the first rotating electrical machine control part 13, the second rotating electrical machine control part 14, and the engagement control part 15 an instruction for controlling a device handled by the control part. The internal combustion engine control part 12 controls the internal combustion engine EG such that the internal combustion engine EG outputs target torque instructed by the main control part 11 or achieves a target rotational speed instructed by the main control part 11. The first rotating electrical machine control part 13 controls the first rotating electrical machine MG1 such that the first rotating electrical machine MG1 outputs target torque instructed by the main control part 11 or achieves a target rotational speed instructed by the main control part 11. The second rotating electrical machine control part 14 controls the second rotating electrical machine MG2 such that the second rotating electrical machine MG2 outputs target torque instructed by the main control part 11 or achieves a target rotational speed instructed by the main control part 11. The engagement control part 15 controls actuators (depiction is omitted) for allowing the first engagement device CL1, the second engagement device CL2, and the third engagement device CL3 to operate, such that each of the first engagement device CL1, the second engagement device CL2, and the third engagement device CL3 goes into a state of engagement instructed by the main control part 11.

In addition, the main control part 11 is configured to be able to obtain information from sensors provided in each part of a vehicle having the vehicle drive device 100 mounted thereon, so as to obtain information on each part of the vehicle. In the present embodiment, the main control part 11 is configured to be able to obtain information from a SOC sensor Se1, a vehicle speed sensor Se2, an amount-of-accelerator-operation sensor Se3, an amount-of-brake-operation sensor Se4, and a shifter position sensor Se5.

The SOC sensor Se1 is a sensor for detecting a state of the electrical storage device BT that is electrically connected to the first rotating electrical machine MG1 and the second rotating electrical machine MG2. The SOC sensor Se1 includes, for example, a voltage sensor, a current sensor, etc. The main control part 11 calculates a state of charge (SOC) of the electrical storage device BT, based on information on a voltage value, a current value, etc., outputted from the SOC sensor Se1.

The vehicle speed sensor Se2 is a sensor for detecting a travel speed of the vehicle having the vehicle drive device 100 mounted thereon. In the present embodiment, the vehicle speed sensor Se2 is a sensor for detecting a rotational speed of the first output member O1. The main control part 11 calculates a rotational speed (angular speed) of the first output member O1, based on information on the rotational speed outputted from the vehicle speed sensor Se2. Since the rotational speed of the first output member O1 is proportional to vehicle speed, the main control part 11 calculates vehicle speed based on a detection signal of the vehicle speed sensor Se2.

The amount-of-accelerator-operation sensor Se3 is a sensor for detecting the amount of driver's operation on an accelerator pedal provided in the vehicle having the vehicle drive device 100 mounted thereon. The main control part 11 calculates the amount of driver's operation on the accelerator pedal, based on a detection signal of the amount-of-accelerator-operation sensor Se3.

The amount-of-brake-operation sensor Se4 is a sensor for detecting the amount of driver's operation on a brake pedal provided in the vehicle having the vehicle drive device 100 mounted thereon. The main control part 11 calculates the amount of driver's operation on the brake pedal, based on a detection signal of the amount-of-brake-operation sensor Se4.

The shifter position sensor Se5 is a sensor for detecting a selected position of a shifter (shifter position) that is operated by the driver of the vehicle having the vehicle drive device 100 mounted thereon. The main control part 11 calculates a shifter position based on a detection signal of the shifter position sensor Se5. The shifter is configured to be able to select a parking range (P-range), a reverse travel range (R-range), a neutral range (N-range), a forward travel range (D-range), etc.

The main control part 11 selects a plurality of operating modes of the first drive unit 100A which will be described later, based on information from the above-described sensors Se1 to Se5. The main control part 11 controls, through the engagement control part 15, each of the first engagement device CL1, the second engagement device CL2, and the third engagement device CL3 to a state of engagement determined based on a selected operating mode, thereby switching to the selected operating mode. Furthermore, the main control part 11 performs, through the internal combustion engine control part 12, the first rotating electrical machine control part 13, and the second rotating electrical machine control part 14, cooperative control of operating states of the internal combustion engine EG, the first rotating electrical machine MG1, and the second rotating electrical machine MG2, thereby enabling the vehicle to perform appropriate travel based on the selected operating mode.

Figures 4, 5:
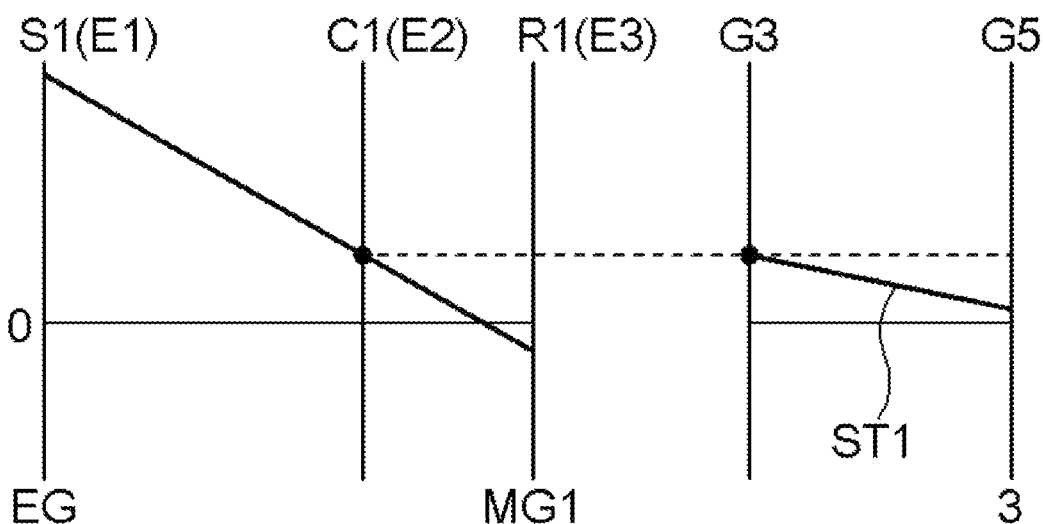
FIG. 4 is a diagram showing the states of engagement devices in each operating mode of the vehicle drive device according to the embodiment.
FIG. 5 is a speed diagram of a distribution differential gear mechanism and a transmission in a fourth mode according to the embodiment.

As shown in FIG. 4, in the present embodiment, the first drive unit 100A has, as operating modes, an electrical torque converter mode (hereinafter, referred to as "eTC mode"), a first EV mode, a second EV mode, a first HV mode, a second HV mode, and a charge mode.

FIG. 4 shows the states of the first engagement device CL1, the second engagement device CL2, and the third engagement device CL3 in each operating mode of the first drive unit 100A of the present embodiment. Note that in the fields of the first engagement device CL1 and the second engagement device CL2 of FIG. 4, "o" indicates that a target engagement device is in an engaged state and "x" indicates that a target engagement device is in a disengaged state. In addition, in the field of the third engagement device CL3 of FIG. 4, "Lo" indicates that the third engagement device CL3 forms the first shift speed (low shift speed) ST1, "Hi" indicates that the third engagement device CL3 forms the second shift speed (high shift speed) ST2, and "N" indicates that the third engagement device CL3 is in a neutral state.

The eTC mode is a mode in which a combination of drive power of the first drive power source D1 and drive power of the internal combustion engine EG is outputted to the first output member O1 from the second rotating element E2 through the distribution differential gear mechanism SP. This mode can amplify torque of the internal combustion engine EG and transmit the amplified torque to the first output member O1, and thus is referred to as so-called electrical torque converter mode.

As shown in FIG. 4, in the eTC mode, control is performed such that the first engagement device CL1 is in an engaged state, the second engagement device CL2 is in a disengaged state, and the third engagement device CL3 is in a state of forming the first shift speed (low shift speed) ST1. That is, in the eTC mode, the first engagement device CL1 is in an engaged state, the second engagement device CL2 is in a disengaged state, and the third engagement device CL3 is in an engaged state. The eTC mode corresponds to a "fourth mode".

In the eTC mode of the present embodiment, the distribution differential gear mechanism SP combines together torque of the first rotating electrical machine MG1 and torque of the internal combustion engine EG and outputs torque larger than the torque of the internal combustion engine EG from the first carrier C1. Then, the transmission TM changes the speed of rotation of the first carrier C1 at a transmission gear ratio determined based on the first shift speed ST1, and transmits the rotation to the transmission output gear 3 (see FIG. 5).

In the first EV mode, control is performed such that the first engagement device CL1 is in a disengaged state, the second engagement device CL2 is in an engaged state, and the third engagement device CL3 is in a state of forming the first shift speed (low shift speed) ST1. On the other hand, in the second EV mode, control is performed such that the first engagement device CL1 is in a disengaged state, the second engagement device CL2 is in an engaged state, and the third engagement device CL3 is in a state of forming the second shift speed (high shift speed) ST2. That is, in the first EV mode and the second EV mode, the first engagement device CL1 is in a disengaged state and each of the second engagement device CL2 and the third engagement device CL3 is in an engaged state. Hence, the first EV mode and the second EV mode provide a state in which power transmission between the internal combustion engine EG and the first wheels W1 is cut off, and a state in which power transmission between the first drive power source D1 and the first wheels W1 is performed. The first EV mode and the second EV mode correspond to a "first mode".

In the first EV mode and the second EV mode, the first engagement device CL1 is brought into a disengaged state, by which the internal combustion engine EG is decoupled from the distribution differential gear mechanism SP, and the second engagement device CL2 is brought into an engaged state, by which the three rotating elements Es1 to Es3 of the distribution differential gear mechanism SP go into a state of rotating together. As a result, in the present embodiment, rotation of the first rotating electrical machine MG1 transmitted to the second gear G2 from the first gear G1 is transmitted as it is to the third gear G3 and the fourth gear G4 of the transmission TM. Then, according to the state of the third engagement device CL3, the speed of the rotation transmitted to the transmission TM is changed at the transmission gear ratio of the first shift speed ST1 in the first EV mode and changed at the transmission gear ratio of the second shift speed ST2 in the second EV mode, and the rotation is transmitted to the transmission output gear 3 (see FIG. 6).

In the first HV mode, control is performed such that the first engagement device CL1 is in an engaged state, the second engagement device CL2 is in an engaged state, and the third engagement device CL3 is in a state of forming the first shift speed (low shift speed) ST1. On the other hand, in the second HV mode, control is performed such that the first engagement device CL1 is in an engaged state, the second engagement device CL2 is in an engaged state, and the third engagement device CL3 is in a state of forming the second shift speed (high shift speed) ST2. That is, in the first HV mode and the second HV mode, each of the first engagement device CL1, the second engagement device CL2, and the third engagement device CL3 is in an engaged state. Hence, the first HV mode and the second HV mode provide a state in which power transmission between both of the internal combustion engine EG and the first drive power source D1 and the first wheels W1 is performed. The first HV mode and the second HV mode correspond to a "third mode".

In the first HV mode and the second HV mode, the first engagement device CL1 is brought into an engaged state, by which the internal combustion engine EG is coupled to the distribution differential gear mechanism SP, and the second engagement device CL2 is brought into an engaged state, by which the three rotating elements Es1 to Es3 of the distribution differential gear mechanism SP go into a state of rotating together. As a result, in the present embodiment, rotation of the internal combustion engine EG transmitted through the input member I and rotation of the first rotating electrical machine MG1 transmitted to the second gear G2 from the first gear G1 are transmitted as they are to the third gear G3 and the fourth gear G4 of the transmission TM. Then, according to the state of the third engagement device CL3, the speed of the rotation transmitted to the transmission TM is changed at the transmission gear ratio of the first shift speed ST1 in the first HV mode and changed at the transmission gear ratio of the second shift speed ST2 in the second HV mode, and the rotation is transmitted to the transmission output gear 3 (see FIG. 6).

In the charge mode, control is performed such that the first engagement device CL1 is in an engaged state, the second engagement device CL2 is in an engaged state, and the third engagement device CL3 is in a neutral state. That is, in the charge mode, each of the first engagement device CL1 and the second engagement device CL2 is in an engaged state, and the third engagement device CL3 is in a disengaged state. Hence, the charge mode provides a state in which power transmission between the internal combustion engine EG and the first drive power source D1 is performed, and a state in which power transmission between both of the internal combustion engine EG and the first drive power source D1 and the first wheels W1 is cut off and the first drive power source D1 generates electric power by drive power transmitted from the internal combustion engine EG. The charge mode corresponds to a "second mode".

Note that in the charge mode, the vehicle may be stopped, or the vehicle may travel by allowing the second rotating electrical machine MG2 to perform motoring by electric power generated by the first rotating electrical machine MG1 or electric power stored in the electrical storage device BT, to transmit drive power of the second rotating electrical machine MG2 to the second wheels W2. A mode in which the vehicle thus travels by drive power of the second rotating electrical machine MG2 while the charge mode is set is referred to as so-called series hybrid mode.

FIG. 5 shows a speed diagram of the distribution differential gear mechanism SP and the transmission TM in the eTC mode of the present embodiment. In the speed diagram of FIG. 5, a vertical axis corresponds to the rotational speed of each rotating element of the distribution differential gear mechanism SP and the transmission TM. Each of a plurality of vertical lines disposed parallel to each other corresponds to each rotating element of the distribution differential gear mechanism SP and the transmission TM. In addition, in the speed diagram of FIG. 5, reference signs shown above the plurality of vertical lines are the reference signs of corresponding rotating elements. Reference signs shown below a plurality of vertical lines are the reference signs of elements that are drive-coupled to rotating elements corresponding to reference signs shown above. Such a method of drawing a speed diagram is also the same for other speed diagrams of FIG. 6, etc.

As shown in FIG. 5, in the eTC mode of the present embodiment, the internal combustion engine EG outputs a positive torque while positively rotating, and the first rotating electrical machine MG1 outputs a positive torque while negatively rotating and generates electric power. By this, torque larger than the torque of the internal combustion engine EG is transmitted to the first carrier C1 of the distribution differential gear mechanism SP. Rotation of the first carrier C1 rotated by the torque is transmitted to the third gear G3 of the transmission TM. Then, rotation whose speed is reduced at a transmission gear ratio determined based on the first shift speed ST1 between the third gear G3 and the fifth gear G5 is transmitted to the transmission output gear 3.

Figure 6:
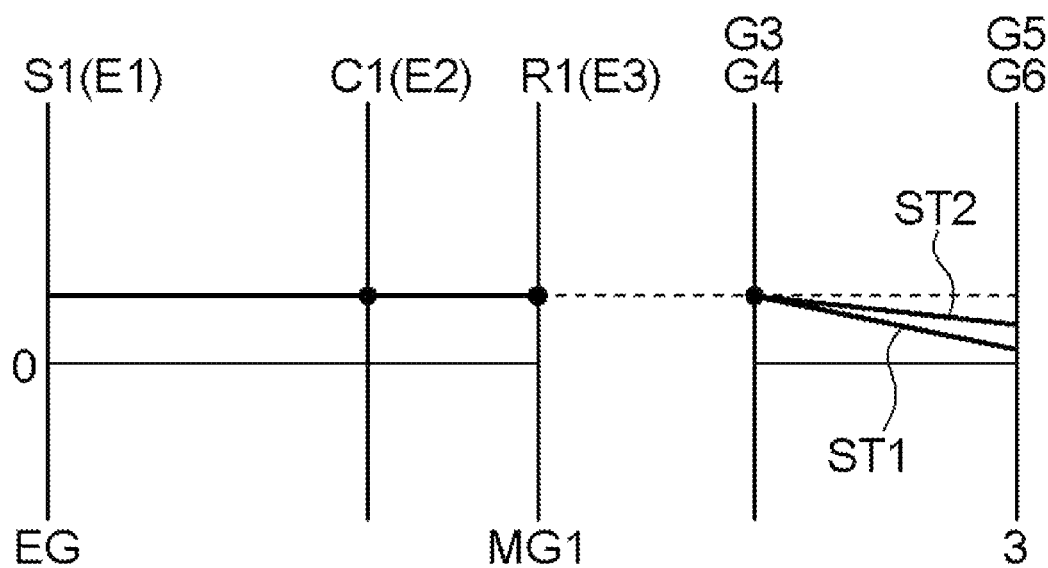
FIG. 6 is a speed diagram of the distribution differential gear mechanism and the transmission in a first mode and a third mode according to the embodiment.

FIG. 6 shows a speed diagram of the distribution differential gear mechanism SP and the transmission TM in the first EV mode and the second EV mode and in the first HV mode and the second HV mode of the present embodiment.

As shown in FIG. 6, in the first EV mode and the second EV mode and in the first HV mode and the second HV mode of the present embodiment, the second engagement device CL2 is brought into an engaged state, by which the three rotating elements Es1 to Es3 of the distribution differential gear mechanism SP go into a state of rotating together. To the three rotating elements Est to Es3 of the distribution differential gear mechanism SP that thus rotate together there are transmitted torque of the first rotating electrical machine MG1 in the first EV mode and the second EV mode, and torque of both of the internal combustion engine EG and the first rotating electrical machine MG1 in the first HV mode and the second HV mode. Of the three rotating elements Es1 to Es3 of the distribution differential gear mechanism SP rotated by the torque, rotation outputted from the first carrier C1 which is the second distribution rotating element Es2 is transmitted to the third gear G3 of the transmission TM. On the other hand, rotation outputted from the first ring gear R1 which is the third distribution rotating element Es3 is transmitted to the fourth gear G4 of the transmission TM. Then, in the first EV mode and the first HV mode, rotation whose speed is reduced at a transmission gear ratio determined based on the first shift speed ST1 between the third gear G3 and the fifth gear G5 is transmitted to the transmission output gear 3. On the other hand, in the second EV mode and the second HV mode, rotation whose speed is reduced at a transmission gear ratio determined based on the second shift speed ST2 between the fourth gear G4 and the sixth gear G6 is transmitted to the transmission output gear 3.

Figure 7:
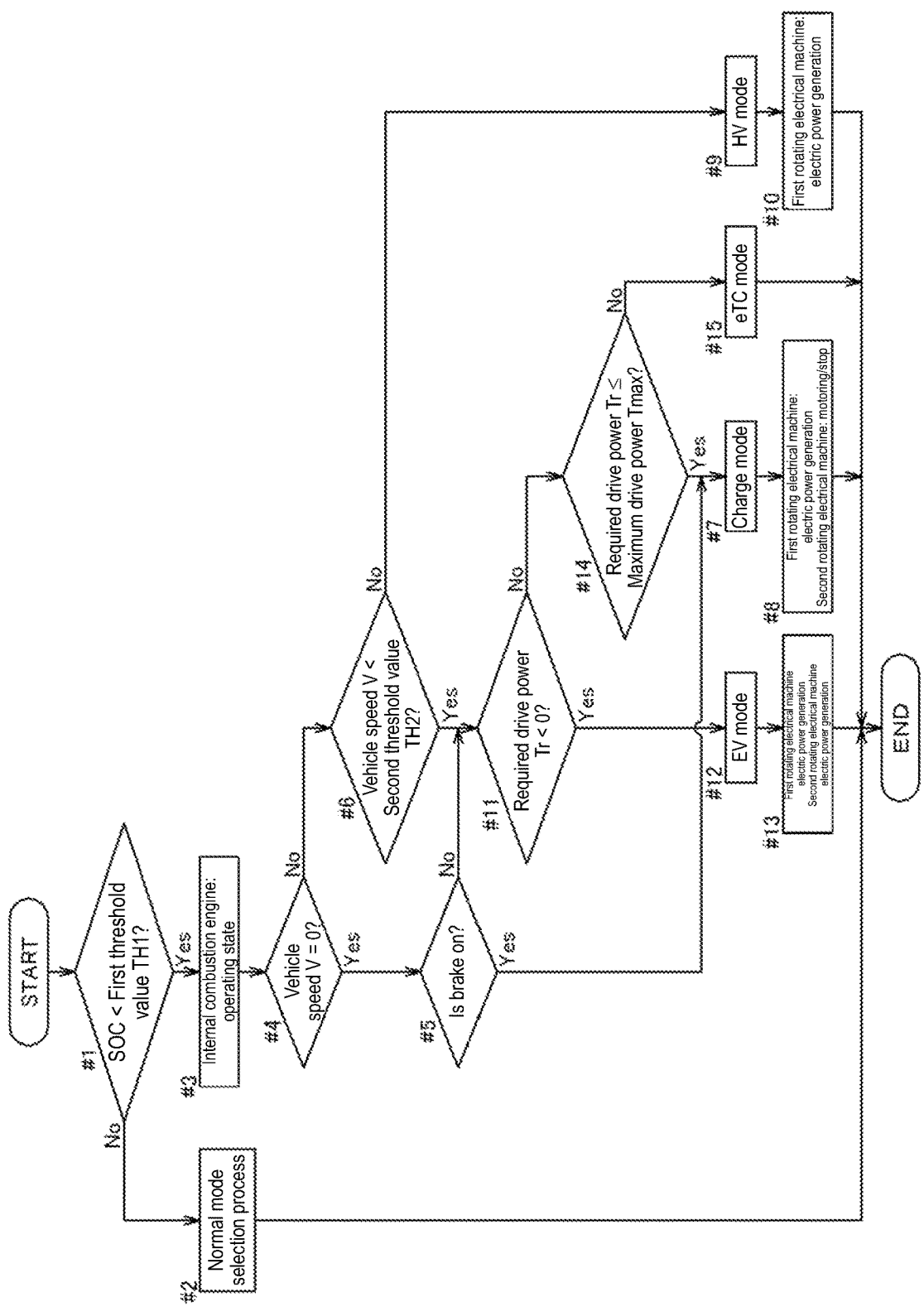
FIG. 7 is a flowchart showing an example of a control process performed by a control device according to the embodiment.

A control process performed by the control device 10 will be described below. FIG. 7 is a flowchart showing an example of a control process performed by the control device 10.

As shown in FIG. 7, the control device 10 determines whether the SOC of the electrical storage device BT is less than a defined first threshold value TH1 (step #1). In the present embodiment, the main control part 11 calculates the SOC of the electrical storage device BT based on information on a voltage value, a current value, etc., outputted from the SOC sensor Se1, and determines whether the SOC is less than the first threshold value TH1. In the present embodiment, the SOC is represented as the percentage (e.g., 0 to 100%) of the level of charge in the electrical storage device BT at a certain point in time relative to a fully charged state (100%). Thus, the first threshold value TH1 is also defined as the percentage of the level of charge relative to the fully charged state (100%). For example, the first threshold value TH1 can be set to a SOC of 20%.

If it is determined that the SOC of the electrical storage device BT is not less than the first threshold value TH1, i.e., the SOC of the electrical storage device BT is greater than or equal to the first threshold value TH1 (step #1: No), then the control device 10 performs a normal mode selection process (step #2). The normal mode selection process is a process that is performed when the SOC of the electrical storage device BT is relatively high and that switches the operating mode of the first drive unit 100A to any one of the eTC mode, the first EV mode, the second EV mode, the first HV mode, the second HV mode, and the charge mode, based on required drive power Tr, vehicle speed V, a mode selection operation performed by the driver, and the like. The required drive power Tr is drive power required for the vehicle, and is more specifically drive power required to transmit to the pair of first wheels W1 and the pair of second wheels W2, and is calculated by the main control part 11 based on information from the amount-of-accelerator-operation sensor Se3 and the amount-of-brake-operation sensor Se4. The vehicle speed V is a travel speed of the vehicle having the vehicle drive device 100 mounted thereon. Note that such a selection process is a general process and thus a detailed description thereof is omitted.

On the other hand, if it is determined that the SOC of the electrical storage device BT is less than the first threshold value TH1 (step #1: Yes), then the control device 10 brings the internal combustion engine EG into an operating state (step #3). In the present embodiment, the internal combustion engine control part 12 brings the internal combustion engine EG into an operating state. That is, when the internal combustion engine EG is in a stopped state, the internal combustion engine EG is allowed to start, and when the internal combustion engine EG is already in an operating state, the operating state is maintained.

Then, the control device 10 determines whether the vehicle speed V is zero, i.e., whether the vehicle is being stopped (step #4). In the present embodiment, the main control part 11 calculates vehicle speed based on a detection signal of the vehicle speed sensor Se2, to determine whether the vehicle is being stopped. Note that here it is preferred that the expression "the vehicle speed V is zero", i.e., "the vehicle is being stopped", include not only a case in which the vehicle speed V is precisely zero, but also a state in which the vehicle speed V is substantially zero (a state in which the vehicle speed V is close to zero). For example, it is preferred that a case in which the vehicle speed V is within ±2 km/hour also be included in a state in which the vehicle speed V is zero.

If it is determined that the vehicle speed V is zero (step #4: Yes), then the control device 10 determines whether the brake of the vehicle is operating (step #5). In the present embodiment, the main control part 11 calculates the amount of driver's operation on the brake pedal based on a detection signal of the amount-of-brake-operation sensor Se4, to determine whether the brake of the vehicle is operating. On the other hand, if it is determined that the vehicle speed V is not zero (step #4: No), then the control device 10 determines whether the vehicle speed V is less than a defined second threshold value TH2 (step #6).

In the present embodiment, the second threshold value TH2 is set to vehicle speed corresponding to vehicle speed V at which when the first engagement device CL1 is brought into a direct-coupling engaged state to set the third mode, the rotational speed of the internal combustion engine EG reaches a lower limit value of rotational speed at which the internal combustion engine EG can autonomously rotate (e.g., idle rotational speed). In this example, the third mode includes the first HV mode and the second HV mode, and thus, the second threshold value TH2 is set to vehicle speed corresponding to vehicle speed V at which when the first HV mode which is a mode with a higher rotational speed of the internal combustion engine EG for the same vehicle speed V is set, a lower limit value of rotational speed at which the internal combustion engine EG can autonomously rotate is obtained. By thus setting the second threshold value TH2 and not selecting the first HV mode and the second HV mode when the vehicle speed V is less than the second threshold value TH2, in a case of vehicle speed V at which the internal combustion engine EG stalls when the first HV mode or the second HV mode is set, the first HV mode and the second HV mode can be prevented from being selected.

If it is determined that the brake of the vehicle is operating (step #5: Yes), since there is a low necessity to drive the first wheels W1, the control device 10 switches the operating mode of the first drive unit 100A to the charge mode (step #7). In the present embodiment, the engagement control part 15 brings each of the first engagement device CL1 and the second engagement device CL2 into an engaged state and brings the third engagement device CL3 into a neutral state.

Furthermore, the control device 10 performs control to allow the first rotating electrical machine MG1 to generate electric power, and allow the second rotating electrical machine MG2 to perform motoring or to stop (step #8). In the present embodiment, the first rotating electrical machine control part 13 performs control to allow the first rotating electrical machine MG1 to generate electric power, and the second rotating electrical machine control part 14 performs control to allow the second rotating electrical machine MG2 to perform motoring or to stop. Then, the control device 10 performs control to output the required drive power Tr from the second drive unit 100B. In the present embodiment, the second rotating electrical machine control part 14 controls the second rotating electrical machine MG2 to output the required drive power Tr from the second drive unit 100B.

If it is determined that the vehicle speed V is not less than the second threshold value TH2, i.e., the vehicle speed V is greater than or equal to the second threshold value TH2 (step #6: No), then the control device 10 switches the operating mode of the first drive unit 100A to the first HV mode or the second HV mode (step #9). In the present embodiment, the engagement control part 15 brings each of the first engagement device CL1 and the second engagement device CL2 into an engaged state and brings the third engagement device CL3 into a state of forming the first shift speed ST1 or the second shift speed ST2.

Furthermore, in the first HV mode or the second HV mode, the control device 10 performs control to allow the first rotating electrical machine MG1 to generate electric power (step #10). In the present embodiment, the first rotating electrical machine control part 13 performs control to allow the first rotating electrical machine MG1 to generate electric power. Then, the control device 10 performs control to output the required drive power Tr from a combination of the first drive unit 100A and the second drive unit 100B. Note that the second rotating electrical machine MG2 may be controlled to generate electric power by regeneration or may be controlled to perform motoring.

If it is determined that the vehicle speed V is not zero (step #4: No) and is less than the second threshold value TH2 (step #6: Yes) or if it is determined that the vehicle speed V is zero (step #4: Yes) and the brake of the vehicle is not operating (step #5: No), then the control device 10 determines whether the required drive power Tr is less than zero (step #11).

If it is determined that the required drive power Tr is less than zero (step #11: Yes), then the control device 10 switches the operating mode of the first drive unit 100A to the first EV mode or the second EV mode (step #12). In the present embodiment, the engagement control part 15 brings the first engagement device CL1 into a disengaged state, brings the second engagement device CL2 into an engaged state, and brings the third engagement device CL3 into a state of forming the first shift speed ST1 or the second shift speed ST2. Note that at this time, the first engagement device CL1 is in a disengaged state and power transmission between the internal combustion engine EG and the first wheels W1 is cut off, but the internal combustion engine EG having been brought into the operating state at the above-described step #3 is controlled to maintain the operating state without being stopped.

In addition, in this case, since the vehicle is decelerating, the control device 10 performs control to allow both of the first rotating electrical machine MG1 and the second rotating electrical machine MG2 to generate electric power by regeneration (step #13). In the present embodiment, the first rotating electrical machine control part 13 performs control to allow the first rotating electrical machine MG1 to generate electric power by regeneration, and the second rotating electrical machine control part 14 performs control to allow the second rotating electrical machine MG2 to generate electric power by regeneration. Then, the control device 10 performs control to output the required drive power Tr from both of the first drive unit 100A and the second drive unit 100B. By this, inertial energy of the vehicle is recovered from both of the first wheels W1 and the second wheels W2, enabling efficient electric power generation.

On the other hand, if it is determined that the required drive power Tr is not less than zero, i.e., the required drive power Tr is greater than or equal to zero (step #11: No), then the control device 10 determines whether the required drive power Tr is greater than maximum drive power Tmax that can be outputted from the second drive unit 100B (step #14). If it is determined that the required drive power Tr is not greater than the maximum drive power Tmax, i.e., the required drive power Tr is less than or equal to the maximum drive power Tmax (step #14: Yes), then the control device 10 performs the above-described step #7 and #8.

On the other hand, if it is determined that the required drive power Tr is greater than the maximum drive power Tmax (step #14: No), then the control device 10 switches the operating mode of the first drive unit 100A to the eTC mode (step #15). In the present embodiment, the engagement control part 15 brings the first engagement device CL1 into an engaged state, brings the second engagement device CL2 into a disengaged state, and brings the third engagement device CL3 into a state of forming the first shift speed ST1. Furthermore, the control device 10 performs control to output the required drive power Tr from both of the first drive unit 100A and the second drive unit 100B.

Figure 8:
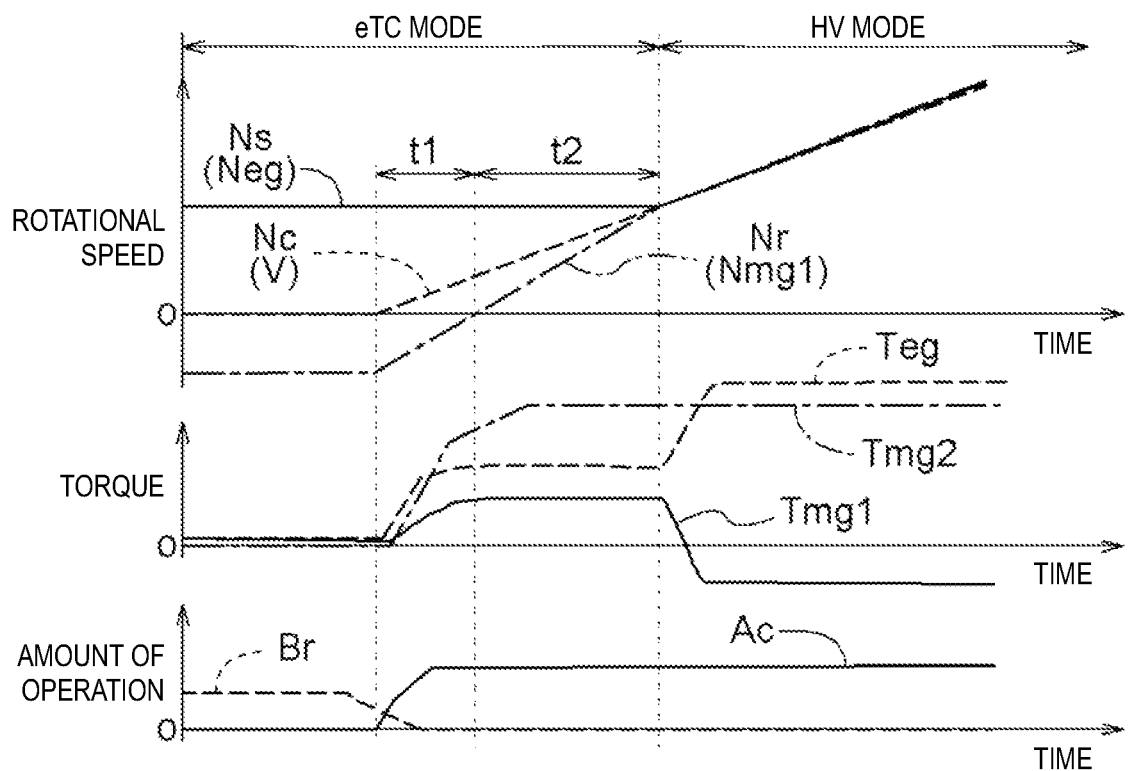
FIG. 8 is a time chart showing an example of a conventional control process performed when a vehicle starts to move from a stopped state.
Figure 9:
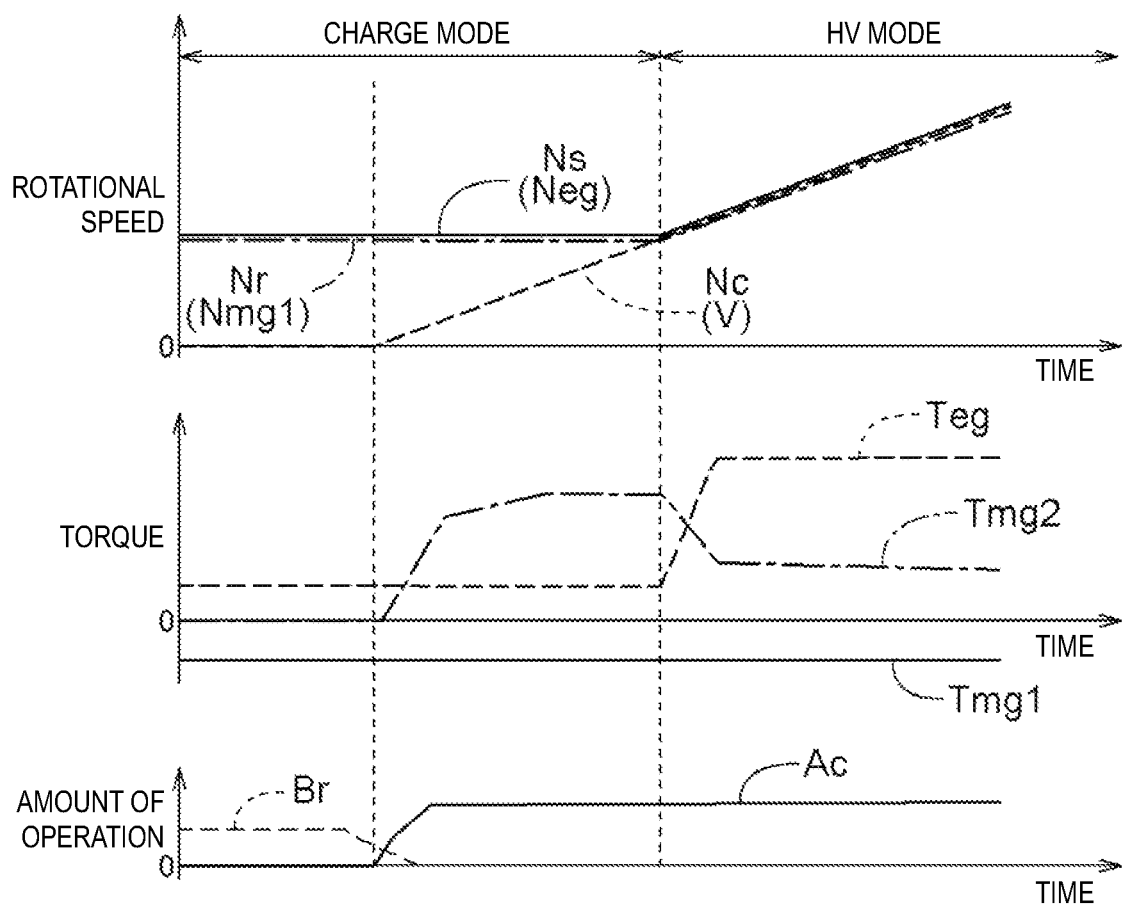
FIG. 9 is a time chart showing an example of a control process performed by the control device according to the embodiment when the vehicle starts to move from a stopped state.

FIGS. 8 and 9 are time charts for a case in which when the SOC of the electrical storage device BT is less than the first threshold value TH1, the vehicle starts to move from a stopped state by the driver disengaging the brake and allowing the accelerator to operate. FIG. 8 is a time chart showing an example of a conventional control process, and FIG. 9 is a time chart showing an example of a control process performed by the control device 10 according to the present embodiment. Note that in the conventional control process, switching between the eTC mode and the first HV mode or the second HV mode is performed according to vehicle speed V.

Here, in FIGS. 8 and 9, "Ns", "Nc", and "Nr" respectively represent the rotational speed Neg of the internal combustion engine EG (output shaft Eo) that is converted into the rotational speed of the first sun gear S1, the rotational speed (vehicle speed V) of the first output member O1 that is converted into the rotational speed of the first carrier C1, and the rotational speed Nmg1 of the first rotating electrical machine MG1 (first rotor Ro1) that is converted into the rotational speed of the first ring gear R1. Furthermore, "Teg", "Tmg1", and "Tmg2" respectively represent the torque of the internal combustion engine EG, the torque of the first rotating electrical machine MG1, and the torque of the second rotating electrical machine MG2. In addition, "Br" and "Ac" respectively represent the amount of operation on the brake pedal and the amount of operation on the accelerator pedal. Note that these reference signs are also the same for the following FIGS. 10 and 11.

As shown in FIG. 8, in the conventional control process, in a state in which the vehicle starts to move from a stopped state and has a relatively low vehicle speed V, the operating mode of the first drive unit 100A is in the eTC mode. In the eTC mode, during a time range t1, the rotational speed Nmg1 of the first rotating electrical machine MG1 is negative, and the torque Tmg1 of the first rotating electrical machine MG1 is positive. Hence, during the time range t1, the first rotating electrical machine MG1 can generate electric power. However, when the vehicle speed V increases, the rotational speed Nmg1 of the first rotating electrical machine MG1 becomes positive. Hence, during a time range t2, the first rotating electrical machine MG1 cannot generate electric power. As such, when the vehicle starts to move from a stopped state, in the eTC mode, there is only a little time for the first rotating electrical machine MG1 to generate electric power, and it is difficult to sufficiently secure the SOC of the electrical storage device BT.

On the other hand, as shown in FIG. 9, in the control process performed by the control device 10 according to the present embodiment, in a state in which the vehicle starts to move from a stopped state and has a relatively low vehicle speed V, the operating mode of the first drive unit 100A goes into the charge mode on condition that required drive power Tr is less than or equal to maximum drive power Tmax that can be outputted from the second drive unit 100B. In the charge mode, regardless of the magnitude of the vehicle speed V, the rotational speed Nmg1 of the first rotating electrical machine MG1 is positive, and the torque Tmg1 of the first rotating electrical machine MG1 is negative. Hence, when the vehicle starts to move from a stopped state, in a state in which the vehicle speed V is relatively low, the first rotating electrical machine MG1 can always generate electric power, and the SOC of the electrical storage device BT can be sufficiently secured. After the vehicle speed V increases and the rotational speed Nc matches the rotational speeds Nr and Ns, the mode transitions to an HV mode (here, the first HV mode), by which the first rotating electrical machine MG1 can continue to generate electric power.

Figure 10:
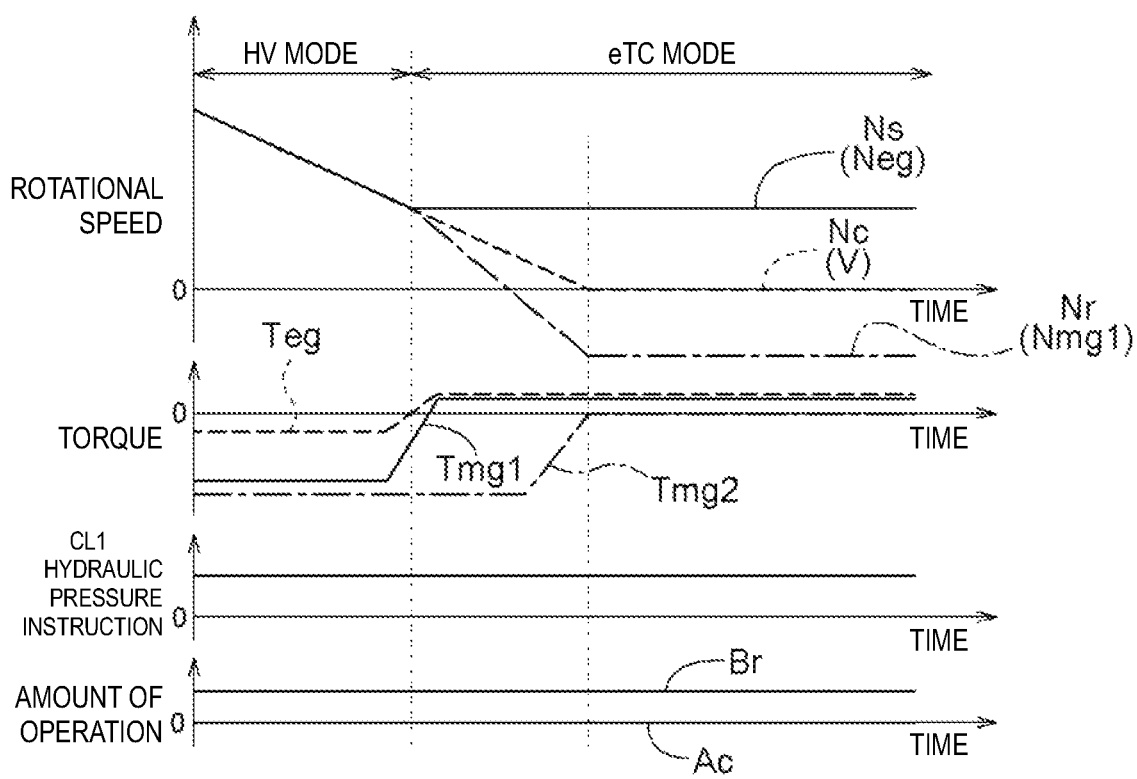
FIG. 10 is a time chart showing an example of a conventional control process performed when the vehicle stops from a traveling state.
Figure 11:
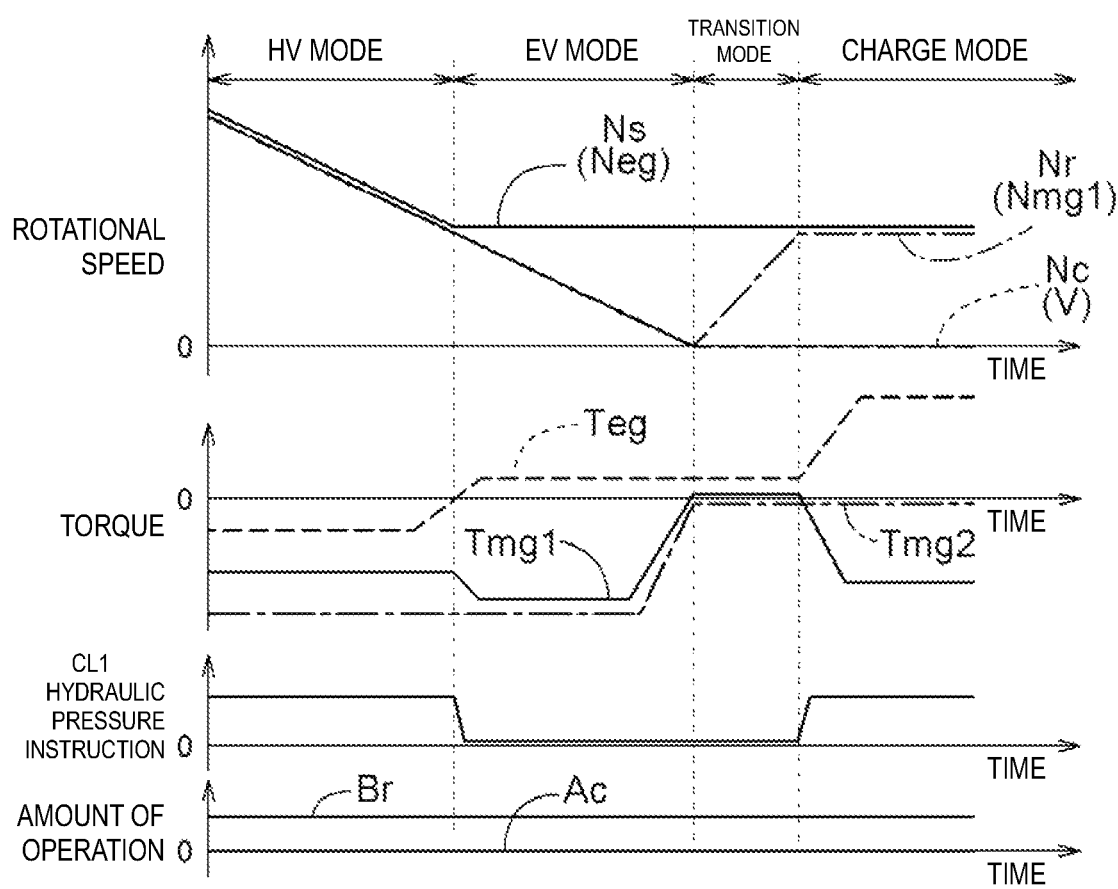
FIG. 11 is a time chart showing an example of a control process performed by the control device according to the embodiment when the vehicle stops from a traveling state.

FIGS. 10 and 11 are time charts for a case in which when the SOC of the electrical storage device BT is less than the first threshold value TH1, the vehicle stops from a traveling state by the driver allowing the brake to operate. FIG. 10 is a time chart showing an example of a conventional control process, and FIG. 11 is a time chart showing an example of a control process performed by the control device 10 according to the present embodiment.

As shown in FIGS. 10 and 11, in both cases of the conventional control process and the control process performed by the control device 10 according to the present embodiment, in a state in which the vehicle speed V is relatively high during deceleration of the vehicle, the operating mode of the first drive unit 100A goes into the first HV mode or the second HV mode. In the first HV mode or the second HV mode, regardless of the magnitude of the vehicle speed V, the rotational speed Nmg1 of the first rotating electrical machine MG1 is positive, and the torque Tmg1 of the first rotating electrical machine MG1 is negative. Hence, in a state in which the vehicle speed V is relatively high during deceleration of the vehicle, the first rotating electrical machine MG1 can always generate electric power. Thus, the SOC of the electrical storage device BT can be sufficiently secured.

However, as shown in FIG. 10, in the conventional control process, in a state in which the vehicle speed V becomes relatively low during deceleration of the vehicle, the operating mode of the first drive unit 100A changes from the first HV mode or the second HV mode to the eTC mode. At this time, as with the case in which the vehicle starts to move from a stopped state, in the eTC mode, the first rotating electrical machine MG1 cannot generate electric power in a state in which the rotational speed Nmg1 of the first rotating electrical machine MG1 is positive, and thus, there is only a little time for the first rotating electrical machine MG1 to generate electric power, and it is difficult to sufficiently secure the SOC of the electrical storage device BT.

On the other hand, as shown in FIG. 11, in the control process performed by the control device 10 according to the present embodiment, in a state in which the vehicle speed V becomes relatively low during deceleration of the vehicle, the operating mode of the first drive unit 100A changes from the first HV mode or the second HV mode to the first EV mode or the second EV mode. In the first EV mode or the second EV mode, both of the first rotating electrical machine MG1 and the second rotating electrical machine MG2 generate electric power by regeneration. Hence, during deceleration of the vehicle, the first rotating electrical machine MG1 can always generate electric power. Thus, the SOC of the electrical storage device BT can be sufficiently secured.

In addition, in the first EV mode or the second EV mode, the first engagement device CL1 is in a disengaged state and power transmission between the internal combustion engine EG and the first wheels W1 is in a cut-off state, but in the control process performed by the control device 10 according to the present embodiment, the internal combustion engine EG is controlled to maintain its operating state without being stopped. Hence, after completing deceleration of the vehicle, the operating mode of the first drive unit 100A transitions to the charge mode at an early stage, by which charging of the electrical storage device BT can continue. Hence, during deceleration of the vehicle, in a state in which a mode transition after completion of the deceleration can be promptly performed, the electrical storage device BT can be appropriately charged.

In addition, in the control process performed by the control device 10 according to the present embodiment, during deceleration of the vehicle, instead of the operating mode of the first drive unit 100A directly transitioning to the charge mode from the first HV mode or the second HV mode, the operating mode of the first drive unit 100A goes through the first EV mode or the second EV mode and transitions to the charge mode after the vehicle stops. In a case of a direct transition from the first HV mode or the second HV mode to the charge mode, when the third engagement device CL3 is switched from an engaged state to a disengaged state, power transmission between both of the internal combustion engine EG and the first rotating electrical machine MG1 and the first wheels W1 goes into a cut-off state. Hence, there is a possibility that vehicle behavior may be influenced by fluctuations in regeneration torque. Specifically, in the first HV mode or the second HV mode, when the first drive unit 100A that is drive-coupled to the first wheels W1 transitions to the charge mode from a state in which regeneration torque (negative torque) is transmitted to both of the first wheels W1 and the second wheels W2, transmission of regeneration torque to the first wheels W1 is not performed, going into a spinning state, and thus, the torque balance between the front and rear wheels of the vehicle changes. On the other hand, in the control process performed by the control device 10 according to the present embodiment, upon transitioning from the first HV mode or the second HV mode to the first EV mode or the second EV mode, the first engagement device CL1 changes from an engaged state to a disengaged state, but power transmission between the first rotating electrical machine MG1 and the first wheels W1 is not cut off. Hence, fluctuations in regeneration torque can be avoided from occurring. Note that a "transition mode" in FIG. 11 is a mode for transitioning from the first EV mode or the second EV mode to the charge mode. In the transition mode, in order to bring the first engagement device CL1 that is in a disengaged state in the first EV mode or the second EV mode into an engaged state, the rotational speed Nr of the first ring gear R1 is increased using the torque of the first rotating electrical machine MG1 to approach the rotational speed Ns of the first sun gear S1.

Other Embodiments (1) In the above-described embodiment, as an example, a configuration is described in which the first drive unit 100A has, as operating modes, the eTC mode, EV modes (the first EV mode and the second EV mode), HV modes (the first HV mode and the second HV mode), and the charge mode. However, the configuration is not limited thereto. The first drive unit 100A may have at least the EV modes and the charge mode. Thus, a configuration may be adopted in which the eTC mode is not provided, or the HV modes are not provided, or both of the eTC mode and the HV modes are not provided. Note that when the eTC mode is not provided, the distribution differential gear mechanism SP may not be provided.

(2) In the above-described embodiment, as an example, a configuration is described in which the first drive unit 100A has, as the EV modes, the first EV mode and the second EV mode that have different transmission gear ratios of the transmission TM, but the EV mode may be a single mode with only one transmission gear ratio. Likewise, in the above-described embodiment, as an example, a configuration is described in which the first drive unit 100A has, as the HV modes, the first HV mode and the second HV mode that have different transmission gear ratios of the transmission TM, but the HV mode may be a single mode with only one transmission gear ratio. When the EV mode and the HV mode each are only one mode, the transmission TM (third engagement device CL3) is configured to implement one shift speed and a neutral state (a state in which power transmission is cut off).

(3) In the above-described embodiment, as an example, a case in which the distribution differential gear mechanism SP is a single-pinion planetary gear mechanism is described, but the configuration is not limited thereto. For example, the distribution differential gear mechanism SP may include a double-pinion planetary gear mechanism. Alternatively, the distribution differential gear mechanism SP may include other differential gear devices such as a configuration in which a plurality of bevel gears are combined together.

(4) In the above-described embodiment, as an example, a configuration is described in which the first engagement device CL1 is a friction engagement device and each of the second engagement device CL2 and the third engagement device CL3 is a mesh engagement device. However, the configuration is not limited thereto, and for example, the first engagement device CL1 may be a mesh engagement device. In addition, at least one of the second engagement device CL2 and the third engagement device CL3 may be a friction engagement device.

(5) In the above-described embodiment, as an example, a configuration in which the second drive power source D2 is the second rotating electrical machine MG2 is described, but the configuration is not limited thereto. The second drive power source D2 may be other drive power sources than a rotating electrical machine, e.g., an internal combustion engine.

(6) Note that a configuration disclosed in each of the above-described embodiments can also be applied in combination with configurations disclosed in other embodiments as long as a contradiction does not arise. For other configurations, too, the embodiments disclosed in this specification are in all respects merely illustrative. Thus, various modifications can be made therein as appropriate without departing from the true spirit and scope of the present disclosure.

SUMMARY OF THE ABOVE-DESCRIBED EMBODIMENTS

A summary of a vehicle drive device (100) described above will be described below.

The vehicle drive device (100) is a vehicle drive device (100) for driving front wheels and rear wheels of a vehicle, and includes:

with either one of the front wheels and the rear wheels being first wheels (W1) and the other one being second wheels (W2), a first drive unit (100A) that includes an input member (I) and a first drive power source (D1) and drives the first wheels (W1), the input member (I) being drive-coupled to an internal combustion engine (EG) included in the vehicle;

a second drive unit (100B) that includes a second drive power source (D2) and drives the second wheels (W2); and a control device (10) that controls the first drive unit (100A), the second drive unit (100B), and the internal combustion engine (EG), and the first drive power source (D1) is a rotating electrical machine (MG1) that gives and receives electric power to/from an electrical storage device (BT), the first drive unit (100A) has a first mode and a second mode as operating modes, the first mode provides a state in which power transmission between the internal combustion engine (EG) and the first wheels (W1) is cut off, and a state in which power transmission between the first drive power source (D1) and the first wheels (W1) is performed, the second mode provides a state in which power transmission between the internal combustion engine (EG) and the first drive power source (D1) is performed, and a state in which power transmission between both of the internal combustion engine (EG) and the first drive power source (D1) and the first wheels (W1) is cut off and the first drive power source (D1) generates electric power by drive power transmitted from the internal combustion engine (EG), and when a state of charge of the electrical storage device (BT) is less than a defined first threshold value (TH1) and a speed (V) of the vehicle is less than a defined second threshold value (TH2), the control device (10) performs control such that when the speed (V) of the vehicle is greater than or equal to zero and required drive power (Tr) which is drive power required for the vehicle is greater than or equal to zero, the operating mode of the first drive unit (100A) is set to the second mode to output the required drive power (Tr) from the second drive unit (100B), and when the speed (V) of the vehicle is greater than zero and the required drive power (Tr) is less than zero, the operating mode of the first drive unit (100A) is set to the first mode to allow the first drive power source (D1) to generate electric power by regeneration, and to bring the internal combustion engine (EG) into an operating state to output the required drive power (Tr) from both of the first drive unit (100A) and the second drive unit (100B).

According to this configuration, when the state of charge of the electrical storage device (BT) is less than the first threshold value (TH1) and the speed (V) of the vehicle is less than the second threshold value (TH2), the control device (10) performs control such that when the vehicle attempts to continue to stop, or when the vehicle attempts to accelerate, or when the vehicle attempts to travel at constant speed, the operating mode of the first drive unit (100A) is set to the second mode to output required drive power (Tr) from the second drive unit (100B). The second mode provides a state in which the first drive power source (D1) generates electric power by drive power transmitted from the internal combustion engine (EG). Hence, while drive power required is secured by the second drive unit (100B), the first drive power source (D1) can generate electric power using drive power of the internal combustion engine (EG). Thus, during the stop, acceleration, and traveling at constant speed of the vehicle, the electrical storage device (BT) can be appropriately charged.

In addition, when the state of charge of the electrical storage device (BT) is less than the first threshold value (TH1) and the speed (V) of the vehicle is less than the second threshold value (TH2), the control device (10) performs control such that when the vehicle attempts to decelerate, the operating mode of the first drive unit (100A) is set to the first mode to allow the first drive power source (D1) to generate electric power by regeneration, and to bring the internal combustion engine (EG) into an operating state to output required drive power (Tr) from both of the first drive unit (100A) and the second drive unit (100B). Hence, using an inertial force of the vehicle, the first drive power source (D1) can generate electric power. In addition, at this time, since the internal combustion engine (EG) is in an operating state without being stopped, after completion of the deceleration of the vehicle, the operating mode of the first drive unit (100A) transitions to the second mode at an early stage, by which charging of the electrical storage device (BT) can continue. Thus, during deceleration of the vehicle, in a state in which a mode transition after completion of the deceleration can be promptly performed, the electrical storage device (BT) can be appropriately charged.

As described above, according to this configuration, during a stop of the vehicle, and during traveling at constant speed, acceleration, and deceleration of the vehicle traveling at a relatively low speed, the electrical storage device (BT) can be appropriately charged. Thus, the state of charge of the electrical storage device (BT) can be sufficiently secured.

Here, it is preferred that the first drive unit (100A) further have a third mode as the operating mode, the third mode provide a state in which power transmission between both of the internal combustion engine (EG) and the first drive power source (D1) and the first wheels (W1) is performed, and when the state of charge of the electrical storage device (BT) is less than the first threshold value (TH1) and the speed (V) of the vehicle is greater than or equal to the second threshold value (TH2), the control device (10) perform control such that the operating mode of the first drive unit (100A) is set to the third mode to allow the first drive power source (D1) to generate electric power by regeneration, and to output the required drive power (Tr) from a combination of the first drive unit (100A) and the second drive unit (100B).

According to this configuration, when the state of charge of the electrical storage device (BT) is less than the first threshold value (TH1) and the speed (V) of the vehicle is greater than or equal to the second threshold value (TH2), while the vehicle travels by drive power of both of the first drive unit (100A) and the second drive unit (100B), the first drive power source (D1) generates electric power using drive power of the internal combustion engine (EG), enabling charging of the electrical storage device (BT). That is, when the vehicle is traveling at a relatively high speed, while drive power required is sufficiently secured, the electrical storage device (BT) can be charged. Thus, the state of charge of the electrical storage device (BT) can be more sufficiently secured.

In a configuration in which the first drive unit (100A) further has the third mode as the operating mode, it is preferred that the first drive unit (100A) further include:

an output member (O1) that is drive-coupled to the first wheels (W1); and a distribution differential gear mechanism (SP) including, in order of rotational speed, a first rotating element (E1), a second rotating element (E2), and a third rotating element (E3), the first rotating element (E1) be drive-coupled to the input member (I), the second rotating element (E2) be drive-coupled to the output member (O1), the third rotating element (E3) be drive-coupled to the first drive power source (D1), the first drive unit (100A) further have, as the operating mode, a fourth mode in which a combination of drive power of the first drive power source (D1) and drive power of the internal combustion engine (EG) is outputted to the output member (O1) from the second rotating element (E2) through the distribution differential gear mechanism (SP), and when the state of charge of the electrical storage device (BT) is less than the first threshold value (TH1) and the speed (V) of the vehicle is less than the second threshold value (TH2), the control device (10) perform control such that when the speed (V) of the vehicle is greater than or equal to zero and the required drive power (Tr) is greater than maximum drive power that can be outputted from the second drive unit (100B), the operating mode of the first drive unit (100A) is set to the fourth mode instead of the second mode, to output the required drive power (Tr) from both of the first drive unit (100A) and the second drive unit (100B).

According to this configuration, when the state of charge of the electrical storage device (BT) is less than the first threshold value (TH1) and the speed (V) of the vehicle is less than the second threshold value (TH2), the control device (10) performs control such that when required drive power (Tr) is so large that the required drive power (Tr) cannot be outputted only from the second drive unit (100B), the operating mode of the first drive unit (100A) is set to the fourth mode instead of the second mode, to output the required drive power (Tr) from both of the first drive unit (100A) and the second drive unit (100B). By this, even when the required drive power (Tr) is large, drive power required can be secured by both of the first drive unit (100A) and the second drive unit (100B). In addition, by setting the fourth mode in a state in which the speed (V) of the vehicle is a relatively low speed less than the second threshold value (TH2), it becomes easier to provide a state in which the first drive power source (D1) generates electric power. Thus, the state of charge of the electrical storage device (BT) can be secured or electric power consumption can be suppressed to a low level.

In a configuration in which the first drive unit (100A) further includes the output member (O1) and the distribution differential gear mechanism (SP), it is preferred that the first drive unit (100A) further include:

a first engagement device (CL1) that disengages and engages power transmission between the input member (I) and the first rotating element (E1);

a second engagement device (CL2) that disengages and engages power transmission between two rotating elements selected from among three rotating elements, the first rotating element (E1), the second rotating element (E2), and the third rotating element (E3); and a third engagement device (CL3) that disengages and engages power transmission between the second rotating element (E2) and the output member (O1), in the first mode, the first engagement device (CL1) be in a disengaged state and each of the second engagement device (CL2) and the third engagement device (CL3) be in an engaged state, in the second mode, each of the first engagement device (CL1) and the second engagement device (CL2) be in an engaged state and the third engagement device (CL3) be in a disengaged state, in the third mode, each of the first engagement device (CL1), the second engagement device (CL2), and the third engagement device (CL3) be in an engaged state, and in the fourth mode, the first engagement device (CL1) be in an engaged state, the second engagement device (CL2) be in a disengaged state, and the third engagement device (CL3) be in an engaged state.

According to this configuration, the operating mode of the first drive unit (100A) can be appropriately changed to any one of the first mode, the second mode, the third mode, and the fourth mode, according to the state of engagement of each of the first engagement device (CL1), the second engagement device (CL2), and the third engagement device (CL3).

In addition, it is preferred that the second drive power source (D2) be a second rotating electrical machine (MG2) that gives and receives electric power to/from the electrical storage device (BT).

According to this configuration, in a case in which the state of charge of the electrical storage device (BT) is less than the first threshold value (TH1) and the speed (V) of the vehicle is less than the second threshold value (TH2), when the speed (V) of the vehicle is greater than zero and the required drive power (Tr) is less than zero, i.e., when the vehicle attempts to decelerate, in addition to the first drive power source (D1), the second drive power source (D2) can also generate electric power by regeneration. Thus, the state of charge of the electrical storage device (BT) can be more sufficiently secured.

INDUSTRIAL APPLICABILITY

A technique according to the present disclosure can be used in a vehicle drive device for driving wheels.

REFERENCE SIGNS LIST

100: Vehicle drive device, 100A: First drive unit, 100B: Second drive unit, 10: Control device, D1: First drive power source, D2: Second drive power source, MG1: First rotating electrical machine, CL1: First engagement device, CL2: Second engagement device, CL3: Third engagement device, I: Input member, EG: Internal combustion engine, BT: Electrical storage device, W1: First wheel, and W2: Second wheel

The invention claimed is:

1. A vehicle drive device for driving front wheels and rear wheels of a vehicle, the vehicle drive device comprising:

with either one of the front wheels and the rear wheels being first wheels and an other one being second wheels, a first drive unit that includes an input member and a first drive power source and drives the first wheels, the input member being drive-coupled to an internal combustion engine included in the vehicle;

a second drive unit that includes a second drive power source and drives the second wheels; and a controller that controls the first drive unit, the second drive unit, and the internal combustion engine, wherein the first drive power source is a rotating electrical machine that gives and receives electric power to/from an electrical storage device, the first drive unit has a first mode and a second mode as operating modes, the first mode provides a state in which power transmission between the internal combustion engine and the first wheels is cut off, and a state in which power transmission between the first drive power source and the first wheels is performed, the second mode provides a state in which power transmission between the internal combustion engine and the first drive power source is performed, and a state in which power transmission between both of the internal combustion engine and the first drive power source and the first wheels is cut off and the first drive power source generates electric power by drive power transmitted from the internal combustion engine, and when a state of charge of the electrical storage device is less than a defined first threshold value and a speed of the vehicle is less than a defined second threshold value, the controller performs control such that when the speed of the vehicle is greater than zero and required drive power is greater than or equal to zero, the operating mode of the first drive unit is set to the second mode to output the required drive power from the second drive unit, the required drive power being drive power required for the vehicle, and when the speed of the vehicle is greater than zero and the required drive power is less than zero, the operating mode of the first drive unit is set to the first mode to allow the first drive power source to generate electric power by regeneration.

2. The vehicle drive device according to claim 1, wherein the first drive unit further has a third mode as the operating mode, the third mode provides a state in which power transmission between both of the internal combustion engine and the first drive power source and the first wheels is performed, and when the state of charge of the electrical storage device is less than the first threshold value and the speed of the vehicle is greater than or equal to the second threshold value, the controller performs control such that the operating mode of the first drive unit is set to the third mode to allow the first drive power source to generate electric power by regeneration, and to output the required drive power from a combination of the first drive unit and the second drive unit.

3. The vehicle drive device according to claim 2, wherein the first drive unit further includes:

an output member that is drive-coupled to the first wheels; and a distribution differential gear mechanism including, in order of rotational speed, a first rotating element, a second rotating element, and a third rotating element, the first rotating element is drive-coupled to the input member, the second rotating element is drive-coupled to the output member, the third rotating element is drive-coupled to the first drive power source, the first drive unit further has, as the operating mode, a fourth mode in which a combination of drive power of the first drive power source and drive power of the internal combustion engine is outputted to the output member from the second rotating element through the distribution differential gear mechanism, and when the state of charge of the electrical storage device is less than the first threshold value and the speed of the vehicle is less than the second threshold value, the controller performs control such that when the speed of the vehicle is greater than or equal to zero and the required drive power is greater than maximum drive power that can be outputted from the second drive unit, the operating mode of the first drive unit is set to the fourth mode instead of the second mode, to output the required drive power from both of the first drive unit and the second drive unit.

4. The vehicle drive device according to claim 3, wherein the first drive unit further includes:

a first engagement device that disengages and engages power transmission between the input member and the first rotating element;

a second engagement device that disengages and engages power transmission between two rotating elements selected from among three rotating elements, the first rotating element, the second rotating element, and the third rotating element; and a third engagement device that disengages and engages power transmission between the second rotating element and the output member, in the first mode, the first engagement device is in a disengaged state and each of the second engagement device and the third engagement device is in an engaged state, in the second mode, each of the first engagement device and the second engagement device is in an engaged state and the third engagement device is in a disengaged state, in the third mode, each of the first engagement device, the second engagement device, and the third engagement device is in an engaged state, and in the fourth mode, the first engagement device is in an engaged state, the second engagement device is in a disengaged state, and the third engagement device is in an engaged state.

5. The vehicle drive device according to claim 1, wherein the second drive power source is a second rotating electrical machine that gives and receives electric power to/from the electrical storage device.

* * * * *